US007814500B2

(12) United States Patent
Weber

(10) Patent No.: US 7,814,500 B2
(45) Date of Patent: Oct. 12, 2010

(54) EVENT CORRELATION FOR DECENTRALIZED MESSAGE PROCESSING

(75) Inventor: Franz Weber, Wiesloch (DE)

(73) Assignee: SAP AG, Walldorf (DE)

( * ) Notice: Subject to any disclaimer, the term of this patent is extended or adjusted under 35 U.S.C. 154(b) by 986 days.

(21) Appl. No.: 11/607,320

(22) Filed: Nov. 30, 2006

(65) Prior Publication Data

US 2008/0134203 A1 Jun. 5, 2008

(51) Int. Cl.
*G06F 15/163* (2006.01)

(52) U.S. Cl. .................................. 719/314; 719/313
(58) Field of Classification Search ................. 719/314, 719/313
See application file for complete search history.

(56) References Cited

U.S. PATENT DOCUMENTS

| | | | | | |
|---|---|---|---|---|---|
| 5,506,966 | A | * | 4/1996 | Ban ............................ | 719/314 |
| 6,226,689 | B1 | * | 5/2001 | Shah et al. .................. | 719/314 |
| 6,229,813 | B1 | * | 5/2001 | Buchko et al. .............. | 370/412 |
| 7,584,472 | B1 | * | 9/2009 | McCormick et al. ........ | 718/100 |
| 7,606,250 | B2 | * | 10/2009 | Shoham et al. ............. | 370/412 |
| 2006/0229925 | A1 | * | 10/2006 | Chalasani et al. ........... | 705/8 |

OTHER PUBLICATIONS

Maheshwari, P., H. Tang, R. Liaung, "Enhancing Web Services With Message-Oriented Middleware." Proceedings of the IEEE International Conference on Web Services (ICWS '04). Jul. 6-9, 2004. pp. 524-531.*
Maheshwari, P., T. Kien, A. Erradi, "QoS-Based Message-Oriented Middleware for Web Services." WISE 2004 Workshop. Oct. 19, 2004. vol. 3307. pp. 241-251.*
Zeng, L., B. Benatallah, A. Ngu, M. Dumas, J. Kalagnanam, H, Chang, "Qos-Aware middleware for Web Services Composition." IEEE Transactions on Software Engineering. vol. 30, Issue 5 (May 2004). pp. 311-327.*
Charfi, A., M. Mezini. "An Aspect-based Process Container for BPEL." Proceddings of the 1st Workshop on Aspect Oriented Middleware Development. Article No. 4. pp. 1-6.*

* cited by examiner

*Primary Examiner*—Hyung S Sough
*Assistant Examiner*—Brian Wathen
(74) *Attorney, Agent, or Firm*—Mintz, Levin, Cohn, Ferris Glovsky, and Popeo P.C.

(57) ABSTRACT

A message is buffered and processing statistics are associated with the message, including characterizations of whether a process instance is to process the message, a number of process instances handling the message, and a number of process instances that have processed the message. A process instance may be generated to process content of the message depending on the message. The message may be dequeued based on the processing statistics. For example, if the processing statistics indicate that no process instances are handling the message and no process instance is to process content of the message. Also, if the content of the message is to be processed by a threshold number of process instances, the message is only dequeued if the processing statistics indicate that the threshold number of process instances have processed the content of the message.

13 Claims, 15 Drawing Sheets

FIG. 8 - head activities – create instance process instance

FIG. 14 sync – insert / delete

EVENT CORRELATION FOR DECENTRALIZED MESSAGE PROCESSING

BACKGROUND

The present disclosure relates to data processing by digital computer, and more particularly to decentralized event processing.

In general, events may be received as messages by a messaging system that may send and receive messages from another messaging system that is part of an application or business. Messages that are received at a messaging system may be processed by a dispatcher, such as a dispatcher 106 of a messaging system 104 in FIG. 1, where messages may be sent and received in send and receive message streams 108, 110 to and from other applications or businesses, as represented by the "world" 102. Messages received by a dispatcher may be distributed to various message queues of a process running in a message system based on one or more keys that indicate a process instance to which a message is related. For example, the dispatcher 106 may distribute messages to various message queues 114, 126, 128, 130 of the process 118 based on keys 112, 120, 122, 124. The keys 112, 120, 122, 124 may be used to indicate which of the process instances 116, 132, 134, 136 is to work on a message. In this model of a messaging system, the dispatching of messages may be considered centralized, as a single dispatcher may distribute messages to various process instances that work on the messages.

SUMMARY

The present disclosure provides methods and apparatus, including computer program products, that implement techniques for decentralized message processing.

In one aspect, a message is buffered in a queue of incoming messages (e.g., a queue that is internal to a messaging system of a process for the messaging system) and processing statistics are associated with the message. The processing statistics characterize whether a process instance is to process content of the message, a number of process instances handling the message, and a number of process instances that have processed the content of the message. A process instance is generated to process the content of the message if the message is a type of message for which a process instance is to be generated (e.g., if a property indicates that a process instance is to be generated). Otherwise, another process instance may process the message or the message may never be processed (e.g., if the message is indicated as being a message to be processed optionally). Further, the message is dequeued based on the processing statistics. The message is dequeued if the processing statistics indicate that no process instances are handling the message and no process instance is to process content of the message. Also, if the content of the message is to be processed by a threshold number of process instances, the message is only dequeued if the processing statistics indicate that the threshold number of process instances have processed the content of the message.

In another aspect, a module is configured to receive messages, initiate buffering of a first message, initialize properties associated with the first message, and selectively generate a process instance to process the first message. The first message is buffered in a first queue of incoming messages that may be internal to a messaging system. The properties that are initialized include a property characterizing whether a process instance is to process the first message, which is initialized to indicate that a process instance is to process the first message; a property characterizing a number of process instances handling the first message, which is initialized to indicate that zero process instances are handling the message; and a property characterizing a number of process instances that have processed content of the first message, which is initialized to indicate that zero process instances have processed content of the first message.

A process instance is generated to process the first message if the first message is indicated as being a type of message for which a process instance is to be generated (e.g., if the message is an unconditional start message). A first process instance performs operations of handling and potentially processing the first message, if the first message matches an index value of the first process instance. Handling the message may include incrementing the number of process instances handling the first message, determining whether the first message meets criteria of a message filter associated with the first process instance, and incrementing the index value of the first process instance.

The first message is processed by the first process instance if the first message meets criteria of the message filter. If the first process instance processes the first message, the property characterizing whether a process instance is to process the first message is set to indicate that a process instance is processing the message (e.g., an instantiable property is set to false). Also, if the first process instance has finished processing the first message, the number of process instances that have processed the first message is incremented.

The first process may evaluate the message and a statement to determine whether other process instances should start or resume processing, if the first message meets criteria of the message filter and the first process instance has the statement that is to be evaluated to determine whether other process instances should start or resume processing. A second one or more process instances may perform the operations of the first process instance with respective index values and message filters.

Variations may include one or more of the following features.

Although the aspects discussed above describe messages that may represent events, other representations may use techniques of the above. For example, data representing an event may be queued in a queue of data representing events. And, the data representing the events may be correlated and processed by process instances. The data may be, for example, an event represented by an event object.

A message may be a logical message that is sent as one or more packets of data. One or more messages may represent an event.

The processing statistics may be initialized to characterize that a process instance is to process the content of the message, no process instances have handled the message (e.g., no process instances have determined whether to process the message), and no process instances have processed the message (e.g., no process instances have consumed content of the message beyond determining whether to process the substance of the message). Generating a process instance may be part of a message protocol for a business process (e.g., a protocol defined in accordance with Business Process Execution Language) that initiates processing the message to perform a business activity.

The dequeueing may be performed for messages at a head message of a queue (e.g., a queue associated with a messaging system). Messages which are to be processed exactly once and have been processed once may be dequeued regardless of a position in a queue.

Generating a process instance may be dependent on the message being a type of message for which process instances are to be generated regardless of a status of process instances (e.g., a message may be an unconditional "start" message for which a process instance is to be generated, regardless of whether a process instance already exists to process the message). Generating a process instance may be dependent on the message being a type of message for which process instances are to be generated if a corresponding process instance does not exist, and the message is at a head of the queue.

A pointer to a message may be buffered in a correlation queue. The correlation queue may be a queue that stores pointers to messages corresponding to a same activity or sub-activity, where the activity may be a business or technical activity. For example, all messages corresponding to processing of an invoice may be referenced in a same correlation queue due to a key identifying the messages as being part of a same activity (e.g., the invoice processing). The pointer may be buffered based on a key identifying an activity associated with the message, where the key is computed based on the message and the correlation queue corresponds to the activity (e.g., a sub-activity). If a process instance is generated to process the message, a combination of properties characterizing the message may be associated with the processing instance. The combination of properties may include an identification of a position of the message in the correlation queue (or, other form of identifying or referencing the message from the correlation queue).

A message may be associated with a process instance as a first message in a group of one or more messages to be processed if criteria are met. The message may be processed in response to a determination that the criteria are met. The criteria may be a timer condition, a number of messages to be received, a set of conditions of properties of a message to be received (e.g., when a work order and payment invoice message are received), and the like. The criteria may be message received by a process instance that causes a receive to become active.

Any of the above aspects may be implemented in one or more computers, e.g., as a computer-implemented method. Computer-program products, embodied on tangible media, may be operable to cause data processing apparatus to perform operations of the above aspects.

The subject matter disclosed herein can be implemented to realize one or more of the following advantages.

Messages in a messaging system may be processed in a decentralized fashion by process instances that access a central queue (e.g., a single logical queue made of several data structures). The messaging system may allow for chaining of messages, such that a sequence of related messages are processed by one process instance (e.g., until the process instance terminates processing messages in the sequence, at which point a new process instance may be generated).

Messages may be mapped to one process instance by virtue of a message being associated with an activity and process instances being associated with the same activity. This may avoid use of a central dispatcher/distributor of messages to process instances. A single process instance may be blocked for an activity rather than all process instances. Thus, other process instances may continue processing messages and overall performance may improve.

Multiple process instances may work on a single logical queue and tacitly communicate through properties associated with messages in the queue. This may advantageously avoid messages from not being processed that are to be processed by having process instances generated based on a status of messages in the queue (e.g., if a message has not been processed by any process instances, a process instance may be generated).

Process instances may have information associated with messages in a queue of messages synchronized with the messages. By synchronizing the information, messages need not be left in a status where a message is not able to be worked, so the message is left for potential processing, but, the messaging system is unable to ascertain whether the message will ever be processed (e.g., referred to as a parking scenario) and thus may generate so-called "Zombie messages."

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
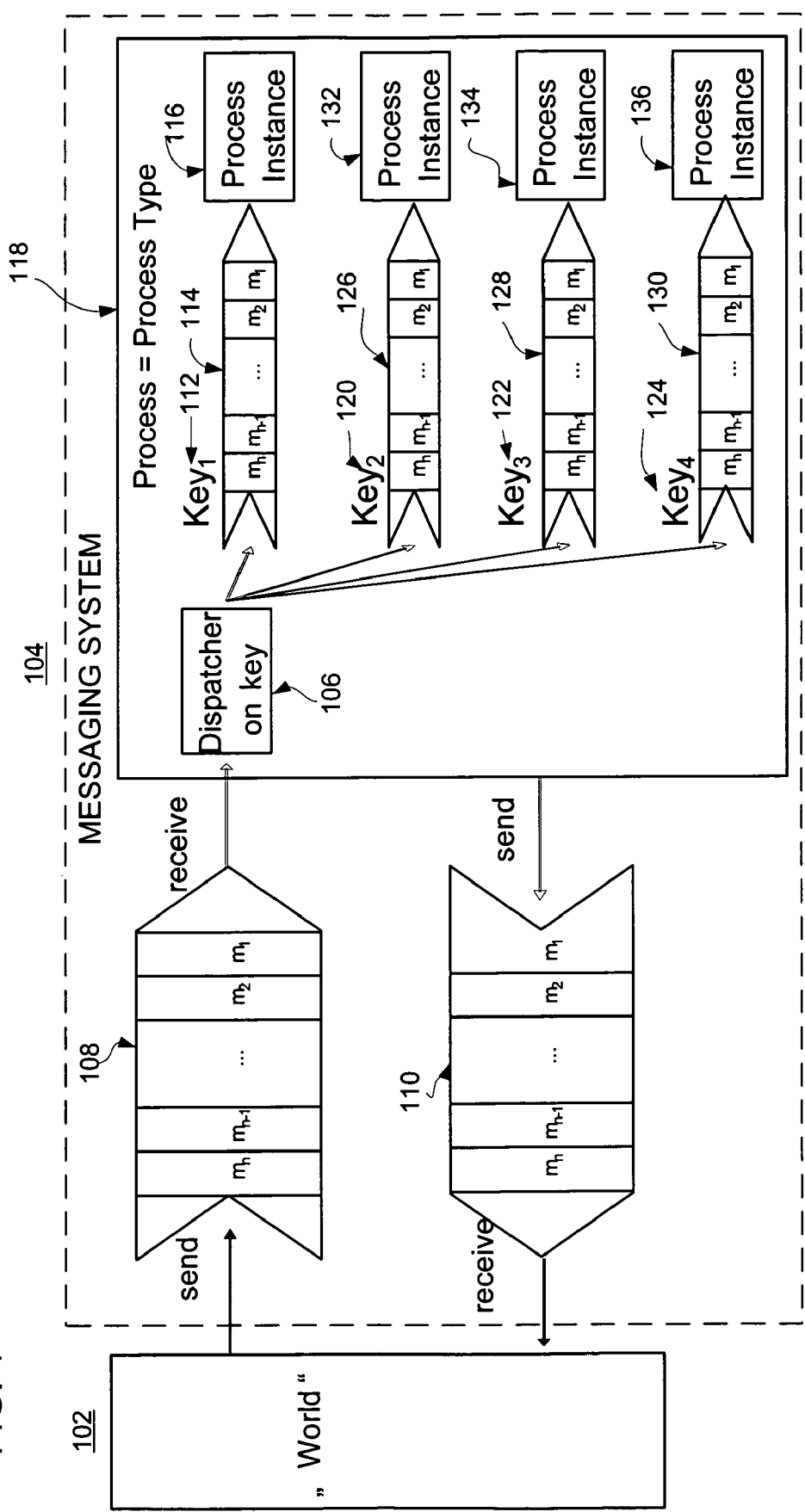
FIG. 1 is a diagram of a messaging system.

Messaging choreography, orchestration, or both may be used to implement a business process (e.g., a protocol for sending messages to perform a business activity). To model a business process, a visual modeling tool may be used to generate a description in a language such as Business Process Execution Language ("BPEL"; e.g., Business Process Execution Language for Web Services version 1.1). In a description of a business process, different types of messages may be used to represent different behaviors and a message may be described as a type of message by properties of a message (e.g., a name of a type of message or a property indicating a characteristic of a message).

One schema of types of messages may include having messages of a type that is to cause a process instance to be generated to process the messages (e.g., referred to as an unconditional start message, or start message), messages of a type that is not to cause a new process instance to be generated to process the messages (e.g., referred to as a receive message), messages of a type that causes a process instance to be generated to process the messages in some circumstances (e.g., referred to as an alternate message), or messages of a type that is to be a last message of all process instances (e.g., referred to as an end message). This schema of types of messages may be adopted as an extension to a processing language (e.g., a tag in an XML ("eXtensible Markup Language")-type message sent in accordance with a BPEL business process may describe which of the types of messages describes a message).

The types of messages may be further refined to include properties that indicate whether a message is to be processed optionally (e.g., need not be processed), whether a message may only be processed by one process instance (e.g., exclusive to having only one process instance process the content of the message rather than, for example, five process instances), and whether a message is to be broadcast across all process instances (e.g., a message indicating bankruptcy may need to be worked on by all process instances). For example, messages which are of a type that are not to cause a process instance to be generated may be processed optionally or processed exclusively depending on properties of the messages.

To correlate messages to an activity or sub-activity, a key may be used that identifies activity or sub-activity (e.g., a property of a message that identifies an activity to which the message relates). During processing of messages, keys may change. For example, a key may be joined with another key to reflect a joining of activities.

In the following descriptions, ordinal numbering such as "first," "second," and the like is used. In general, ordinal numbering is used to distinguish between items (e.g., items in a drawing), and, as such, does not necessarily imply a chronology or degree of importance. For example, a first message in a list is not necessarily a message received first in time. As another example, a first process instance is not necessarily a process instance that has been generated before a second process instance.

The following descriptions describe the use of messages to represent events of a computing landscape that may span several computing systems (e.g., a landscape including computing systems of various industries that communicate with messages, such as business to business or application to application messages). However, the techniques, mechanisms, or both may be applied to events that have other representations and other types of environments. For example, events may be represented by an event object that is passed internally in a system and the event objects may be queued in a queue of event objects to be handled by process instances.

Figure 2:
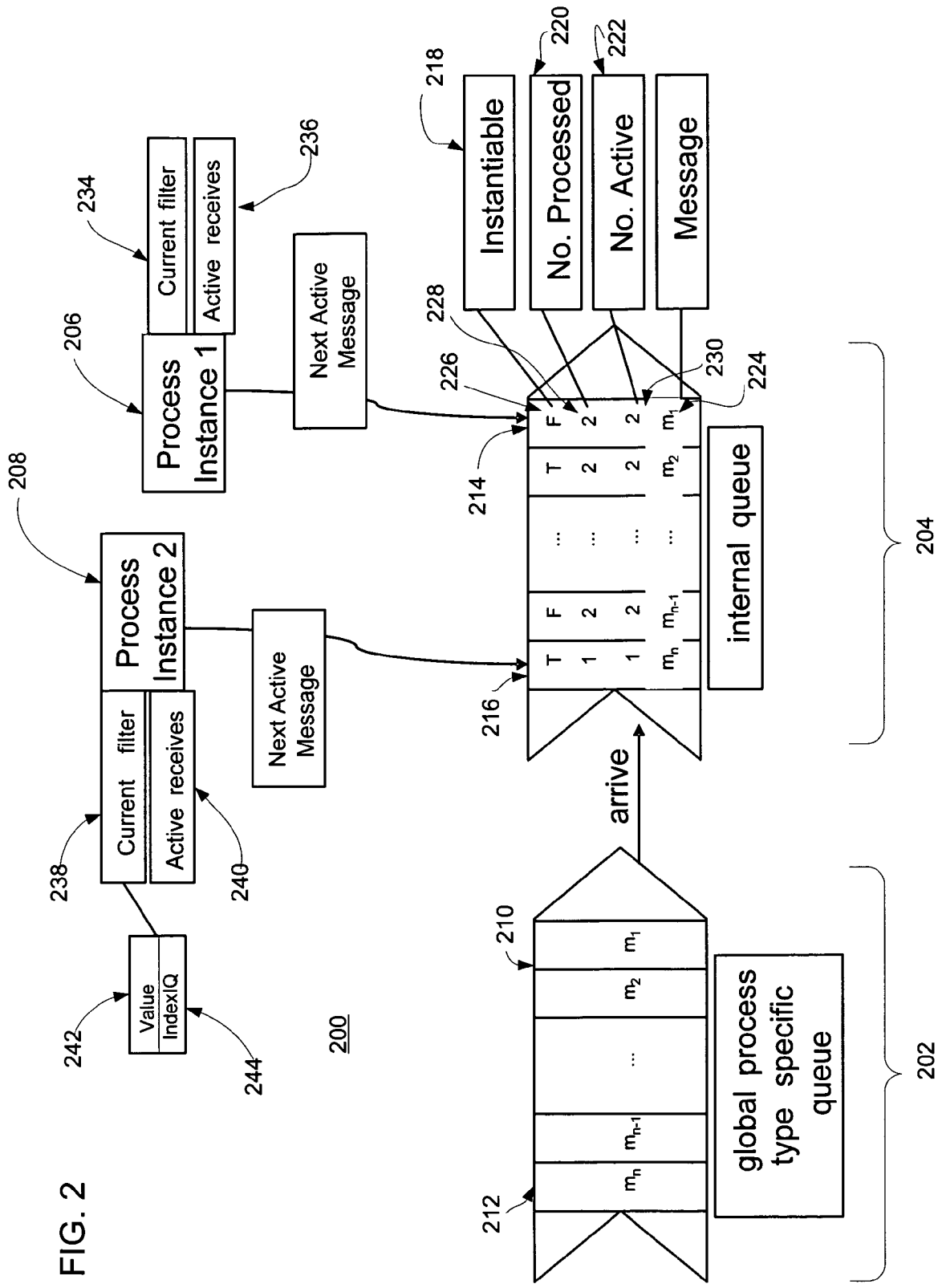
FIG. 2 is a diagram of a messaging system.

FIG. 2 is a diagram of a messaging system 200. In general, the messaging system 200 may receive messages at a global process type specific queue 202, including a first message $m_1$ (210) to an $n^{th}$ message $m_n$ (212). Although not shown, there might be several process types at once, which are handled by the messaging system 200 by copying each incoming message of each process type to the global process type specific queue 202, for example, based on static message type subscriptions. Messages from the global process type specific queue 202 may be buffered by the messaging system 200 at an internal queue 204 with various properties (e.g., as a form of associating the messages with the various properties). The various properties buffered at the internal queue 204 may be initialized to certain values to indicate a state of a property associated with a specific message. For example, a first message 224 is buffered with various properties 218, 220, 222.

Messages that are buffered at the internal queue 204 may be worked on (e.g., processed) by a first and second process instance 206, 208. The process instances 206, 208 may be generated before respective messages arrive or the process instances 206, 208 may be generated as messages are determined to require a new process instance to work on the messages. The process instances 206, 208 may move down the internal queue 204 and determine whether to work on one of the buffered entries having messages from $m_1$ (214) to $m_n$ (216) by determining whether one of the messages matches current filters 234, 238 of a respective process instance. Messages may be dequeued under various circumstances, such as, for example, when a message has been processed by a process instance and the message is at a head of the internal queue 204.

The process instances 206, 208 may work consecutively on messages, including handling of messages to determine if messages match a filter or processing content of messages in accordance with a business process. In addition, the process instances 206, 208 may work independently and in parallel. For example, the process instances 206, 208 may process a same message at a same time or different messages at a same time. Also, a process instance may be blocked while not blocking another process instance. For example, the first process instance 206 may be blocked while waiting for a period of time, without affecting handling or processing of messages by the second process instance 208.

In some messaging systems, messages are not necessarily processed although they are intended to be processed (e.g., sent with an expectation of being processed). This may occur, for example, where a message is not expected to arrive, a message dispatcher distributes the message to a process-instance specific queue, and the process instance terminates prior to receiving the message or processing content of the message. Such messages may be referred to as "zombie" messages. To assist in avoiding zombie messages, techniques may be implemented, such as, for example, generating a process instance for a message that is to be processed and does not have a corresponding process instance. Also, a requirement may be implemented that each message must be processed at least once, unless a message is optional. By implementing techniques, such as the example techniques, that assist in processing such messages, a zombie-free messaging system may be achieved.

Referring back to FIG. 2, the various properties 218, 220, 222 buffered at the internal queue 204 include a first property "Instantiable" 218, a second property "No. Processed" 220, and a third property "No. Active" 222, which are buffered with the first message 224. The buffering of the various properties 218, 220, 222 with the first message 224 associates the properties 218, 220, 222 with the first message 224. The properties 218, 220, 222 characterize aspects of the first message 224, which may be represented by their values 226, 228, 230. For example, the first property 218 characterizes whether a process instance may be generated to handle the message 224, the second property 220 characterizes a number of process instances that have worked on the content of the first message, and the third property 222 characterizes a number of process instances to handle the first message (e.g., a number of process instances to have the message as a next message to work on or currently handling the message). For example, each of the current filters 234, 238 may indicate a next message to handle (e.g., a next message to look at to see if the message matches the filter). And, "No. Active" (222) may denote a number of process instances for which this message is the "next active message" (e.g., a next message to handle).

The first, second, and third properties 218, 220, 222 may be initialized to default values, for example, after being buffered in the internal queue 204. The initial values may indicate that a process instance has not yet worked on the first message (e.g., by setting a Boolean variable corresponding to the first property 218 to "true"), that zero process instances are working on content of the first message 224 (e.g., by setting an integer variable corresponding to the second property 220 to zero), and that zero process instances have the messages as their next active message 224 (e.g., by setting an integer variable corresponding to the third property 222 to zero). Once initialized, process instances, such as the first and second process instances 206, 208, or a module that manages the internal queue 204 (e.g., an object representing the queue), may modify the values 226, 228, 230 of the first, second, and third properties 218, 220, 222. Modifying the values may be determined based on operations of process instances or a module managing the queue.

The properties 218, 220, 222 may be used to determine whether a process instance is to be generated for the first message 224 or whether the first message 224 is to be removed from the internal queue 204 (e.g., dequeued). In addition, the properties may be used for other operations performed in the messaging system 200.

The first and second process instances 206, 208 filter messages and process content of messages. In addition, the first and second process instances 206, 208 may handle message chaining semantics. The first and second process instances 206, 208 include current filters 234, 238, which may be used to determine messages that are to be processed by a respective process instance (e.g., a next "active message"). A filter of a process instance (e.g., the current filters 234, 238) may change, for example, in response to an event described by a business process (e.g., to start processing messages related to a sub-activity, to stop processing messages with a current filter after a number of messages, and the like).

The current filters 234, 238 may include one or more value properties and one or more index properties, as indicated by a Value property 242 and IndexIQ property 244 of the current filter 238 of the second process instance 208. The value property may characterize criteria for which a message is to be associated with a respective process instance (e.g., if the message is to be processed by the process instance) and the index property may characterize a next message having that value in the internal queue 204 that a respective process instance is to handle (or, e.g., is handling). For example, the Value property 242 of the second process instance 208 may have a key value of "WorkOrder" to represent that all messages with the key value WorkOrder are to be processed by the second process instance 208. As another example, the IndexIQ property 244 may have a value of sixty to represent that the second instance 208 has a sixtieth message as the next message in the internal queue 204 matching the value "WorkOrder" (or, e.g., the index may use another type of identifier to identify a message in a queue and the identifier need not be an absolute position; e.g., a message may have an associated number that indicates a relative position, or a message may have an alphanumeric label indicating a message in a queue; or, e.g., if absolute indices are used, they may be updated to compensate for changes in a queue, such as a deletion of a head of a queue).

In implementations, queues (e.g., the internal queue 204) and indices may guarantee that the indices are not invalidated at any point in time and that the order of incoming messages is maintained. For example, incoming messages may be numbered consecutively, indices to messages may be numbers, queues may be mappings from numbers to messages, and a number of a message might never change. In that example, the order of messages may be determined by their number. Deleting a message might not invalidate these assumptions (e.g., as the numbers are retained for the messages). As another example, incoming messages may be inserted into an internal queue, indices may be object references into the queue, queues may be messages linked with object references, and the object reference of a message might never change. In that example, the order of messages may be determined by their position in the queue, deletion of a message might not invalidate a reference to the message, and deletion of a message may require that the linking in the queue be updated.

Chaining semantics may be implemented, which may provide for exclusive processing of a chain of messages by a single process instance. Chaining may be implemented by allowing a process instance to be generated if a process instance does not exist for a chain of messages and, not generating another process instance if the chain of messages exists, unless the process instance processing the chain stops processing the chain. Different types of events may cause processing of a chain of messages to stop by a process instance, such that a process instance would be generated to process other messages in a chain of messages. As examples, a process instance may stop processing a chain of messages after fifty messages have been processed or after five minutes.

The first and second process instances 206, 208 have respective active receive filters 236, 240. In contrast to the current filters 234, 238, which may be limited to describing messages that are to be associated with a process instance (e.g., a stream of messages to subscribe that may be processed by a process instance), the active receives 236, 240 may be used to indicate messages that a process instance is able to process at the moment (e.g., indicating criteria for messages being processed or not being processed from the set of messages corresponding to the current filters 234, 238). In some instances, the active receives filters 236, 240 may indicate that no messages are to be processed at the moment (e.g., the process instance is not yet able to work on messages), although many messages may be associated with the process instances 206, 208.

For example, the combination of a filter for determining messages to associate with a process instance and a filter of messages to process (e.g., an active receive filter and a current filter) may be similar to a clerk that is to handle all customers at a cashier. The clerk may be able to handle only one customer at a time. In other words, he may have only one "active receive". Hence, other customers may have to queue up. If the clerk leaves for a lunch break, the customers may have to be requeued at a different cashier. Similarly, for a message stream, a process instance may subscribe to handle all orders for a certain shipping location. At the beginning of the process, a "receive" of an order is active. However, having received one order the process instance may, for example, have to look up data in a database, which requires time. During that period of time, the process instance might not be able to handle the next order. Thus, no receive may be active. If the first order is handled, the next receive may become active and the next order may be handled.

The active receives may be used to handle certain correlation patterns, such as chaining. For example, with the use of the active receives, a process instance may bulk messages and handle only a certain amount of work before being unable to handle further work (e.g., before a correlation instance of a process instance is deleted). For example, a process instance may queue and process fifty messages that correspond to fifty orders, and, after fifty orders the process instance may produce no further active receives and the correlation instance may be deleted. In such a scenario, additional messages may cause a new process instance to be generated, and that new process instance may handle the additional messages.

Having a single queue and decentralized processing by multiple process instances may allow for errors to cause only one process instance to be blocked (although, further process instances for a same activity may be blocked from being generated and messages may be prevented from being dequeued from an internal queue).

Certain types of errors may be detected by a messaging system (e.g., the messaging system 200) but handled by at an application level. For example, if multiple orders having a same key are received, such that a same order may be processed twice, a first process instance processing a first order may block processing of messages and raise an exception such that an application may resolve the scenario. Such a scenario may be detected when an unconditional start message for the second order is handled and the messaging system realizes that a process instance is already running for the same key.

Figure 3:
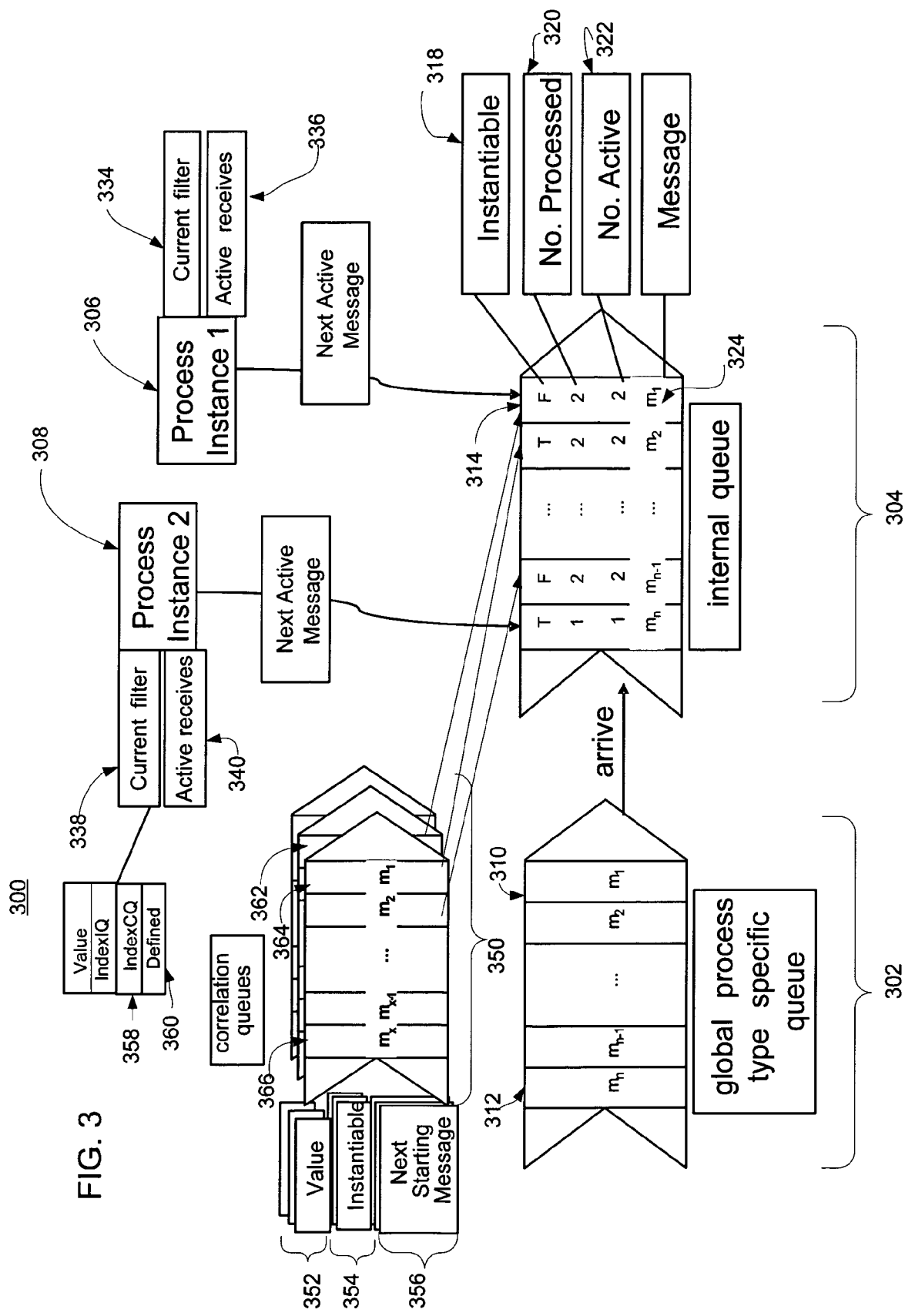
FIG. 3 is a diagram of a messaging system including correlation queues.

FIG. 3 is a diagram of a messaging system 300 including correlation queues 350. The messaging system 300 of FIG. 3 has many components that are similar to components of the messaging system 200 of FIG. 2, with an exception of correlation queues 350; associated Value properties 352, Instantiable properties 354, and Next Starting Message properties 356; and correlation queue indices and defined properties for current filters (e.g., a correlation queue index 358 and defined property 360 for a current filter 338 of a second process instance 308). Components in the message system 300 of FIG. 3 that are similar to components of the messaging system 200 of FIG. 2 may perform similar operations. For example, the internal queue 204 of FIG. 2 and the internal queue 304 of FIG. 3 may each serve as a buffer for incoming messages of respective messaging systems 200, 300.

In general, the correlation queues 350 may assist in associating similar messages such that a process instance need not handle each of the messages in the internal queue 304 to determine whether a message matches criteria of a current filter of a process instance. Each of the correlation queues 350 may correspond to a distinct key (e.g., a correlation queue may have a key distinct from other keys corresponding to other correlation queues, although not necessarily unique; e.g., a first and second correlation queues first may have keys "invoice" and "payment"), and a filter of a process instance may use one or more keys to determine whether messages in a correlation queue are to be processed (e.g., worked on) by the process instance, rather than iterating through each message of a queue of received messages of a messaging system (e.g., rather than iterating through each message in the internal queue 304). Various techniques may be used to map a process instance to a correlation queue.

In general, the messaging system 300 may receive messages at a global process type specific queue 302, including a first message $m_1$ (310) to an $n^{th}$ message $m_n$ (312). Messages from the global process type specific queue 302 may be buffered by the messaging system 300 at an internal queue 304 with various properties, and at one of the correlation queues 350. For example, a first message 324 is buffered with various properties 318, 320, 322, and a pointer 362 to the first message 324 (e.g., the queue entry for the first message 314) is buffered at one or more of the correlation queues 350 with various properties, which are the Value, Instantiable, and Next Starting Message properties 352, 354, 356 (e.g., a value, instantiable property and next starting message property for each correlation queue).

Messages that are buffered at the internal queue 304 may be worked on by a first and second process instance 306, 308. The process instances 306, 308 may be generated before respective messages arrive or the process instances 306, 308 may be generated as messages are determined to require a new process instance to work on the messages. The process instances 306, 308 may move down one of the correlation queues 350 and work on one of the buffered entries for messages from $m_1$ (364) to $m_x$ (366) by determining which of the correlation queues 350 matches current filters 334, 338 of a respective process instance (e.g., by determining which of the Values 352 correspond to one of the current filters 334, 338 of one of the process instances 306, 308), determining a next message in a corresponding correlation queue to be processed (e.g., by reading one of the Next Starting Message properties 356 corresponding to the correlation queue for the process instance), reading a pointer in one of the correlation queues 350, and determining from the pointer an associated message in the internal queue 304. By having messages buffered at the correlation queues 350 and having process instances work on the correlation queues 350, the messages in the internal queue 304 are processed without having each process instance iterate through each message in the internal queue 304. Although messages are queued in a correlation queue and associated with a process instance, messages might not be worked on unless they match active receives 336, 340 (e.g., messages indicated as being "active"). For example, messages in a correlation queue might not be processed by a process instance unless they are indicated as being active.

Variations of the messaging systems 200, 300 may exist. For example, the internal queue 204 may be referred to as being internal, as the queue may be internal to the messaging system 200 such that only the messaging system 200 can interact with the queue; however, in variations the queue need not be considered internal. As another example, the correlation queues 350 may buffer messages rather than pointers to messages.

FIGS. 4-14 include diagrams of activities that may occur at a messaging system, which may be the messaging system 300 of FIG. 3. In the diagrams, rounded boxes represent activities; square boxes represent parts of a messaging system, or activities performed by the parts; arrows represent interaction between activities, parts of a messaging system, or both; and, boxes with a triangular edge represent events (e.g., determinations).

Figure 4:
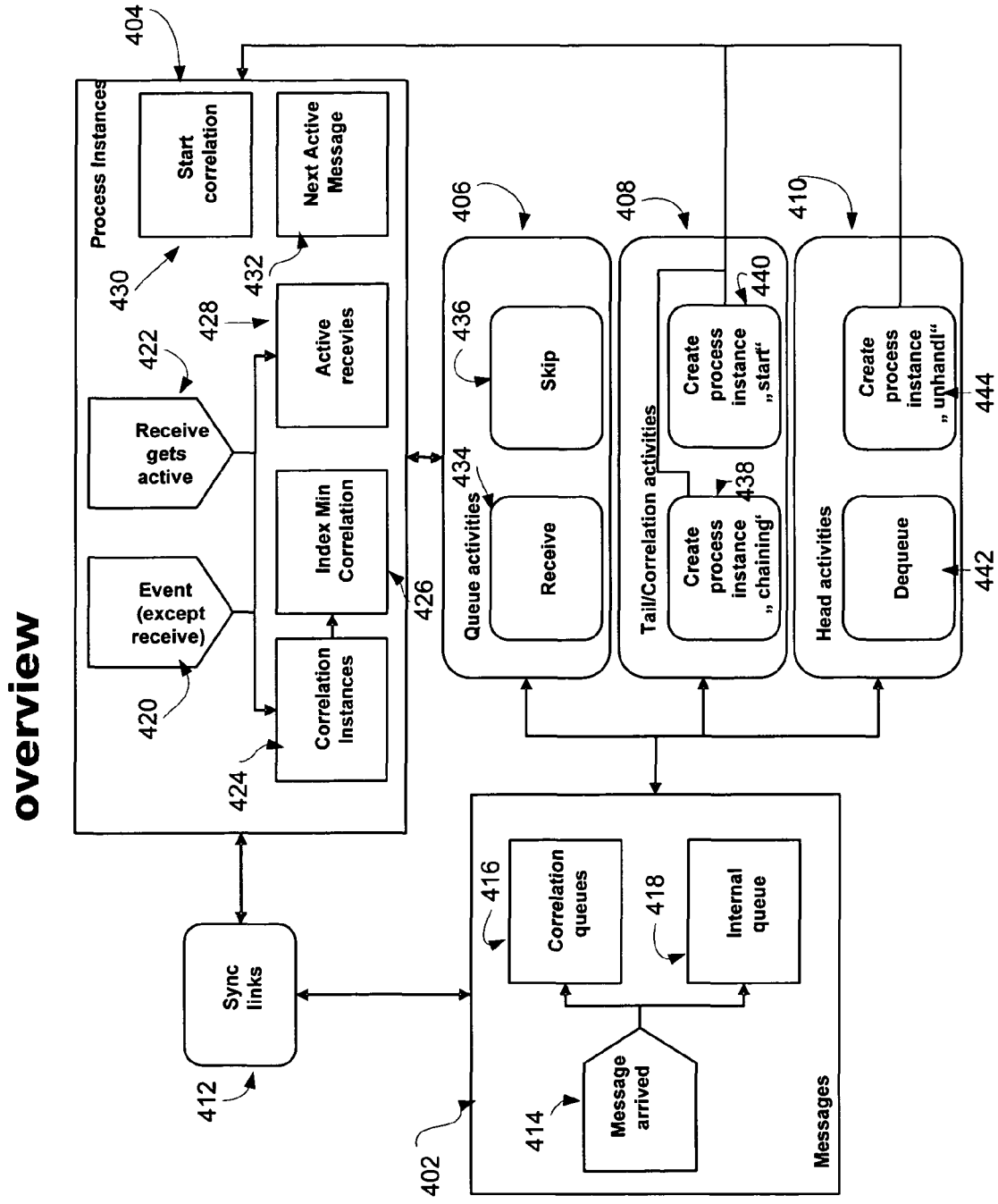
FIG. 4 is a high-level diagram of activities that may be performed at a messaging system.

FIG. 4 is a high-level diagram of activities that may occur at a messaging system. The diagram includes messages 402, process instances 404, queue activities 406, tail and correlation activities 408, head activities 410, and synchronization of links (e.g., references between correlation queues and correlation instances) 412.

For the messages 402, messages are queued at the correlation queues (416) and the internal queue (418) in response to a message arriving (414). Messages may be queued by a module that manages the messaging system.

For the process instances 404, events other than receive (420) and receive becoming active (422) may cause activities to be performed on correlation instances (424), a minimum index for a group of correlation instances (426) (e.g., an identification of a first item in a correlation queue to be processed, from a group of correlation queues associated with a process instance), or active receives (428). Events other than receive (420) may include, as examples, dequeueing of a message, an end of a timer, and a start or end of a blocking of messages. A receive becoming active (422) represents an event of a process instance reaching a state in which the process instance is able to receive a next message for a certain correlation instance.

Activities performed to correlation instances (424) or the minimum index for a group of correlation instances (426) may include working on messages in one of the correlation instances (424); dequeueing messages in one of the correlation instances (424); and updating the minimum index for a group of correlation instances (426) to reflect work on correlation instances (424) or dequeueing of messages in one of the correlation instances (424). Activities performed to active receives (428) may include viewing criteria of the active receives (428) (e.g., to determine whether a message meets criteria of an active receives (428)), and setting the active receives (428) (e.g., setting criteria for which a group of messages may be processed).

A start correlation (430) represents a current filter for the process instances 404 (e.g., the current filter 334 of the first process instance 306 of FIG. 3). The start correlation may be used to determine messages that may be processed by a respective process instance. A "next active message" property 432 may indicate where in an internal queue, such as the internal queue 304 of FIG. 3, a respective process instance is processing messages (e.g., a next message to be processed or a message currently being worked on; e.g., a message for which the process instance is considered for a tabulation of active process instances, such as the No. Active variable 322 of FIG. 3).

The queue activities 406 include receive activity 434 and skip activity 436. The receive activity 434 may include operations that occur in response to a message being received by a process instance, such as reading and reacting to the content of a message by, for example, deleting or creating correlation instance; moving the "next active message" reference; and the like. The skip activity 436 may include operations that occur to skip a message in a queue (e.g., if a message is not to be worked on by a process instance; e.g., if a message does not match a filter of a process instance).

The tail and correlation activities 408 include generating a process instance for chaining 438 and generating a process instance for a start message 440. Generating a process instance for chaining 438 may occur in response to a message indicating that the message is a first message of a group of messages to be received, and criteria for which the group is to be considered. Generating a process instance for a start message 440 may occur in response to a messaging system determining that a message is of a type for which a process instance is to start.

The head activities 410 include dequeueing 442 and generating a process instance for unhandled messages 444. Dequeueing 442 may include removing a message from a queue of incoming messages, such as the internal queue 304 of FIG. 3, under certain conditions when a message is at a head of a queue (e.g., a head message of a queue). Generating a process instance for unhandled messages 444 may include generating a process instance for a message that has no process instance corresponding to the message (e.g., a process instance for a same key does not exist), when the message is at a head of a queue of messages (e.g., the internal queue 304 of FIG. 3).

The synchronization of links 412 may synchronize work being done on the set of correlation instances in a process instance or in correlation queues. As examples, synchronizations might be performed when a correlation instance is generated or deleted. As another example, synchronization might be performed if a message is received by the messaging system and enqueued in a correlation queue which was empty before the message was in the correlation queue, such that correlation instances point to that queue.

Figure 5:
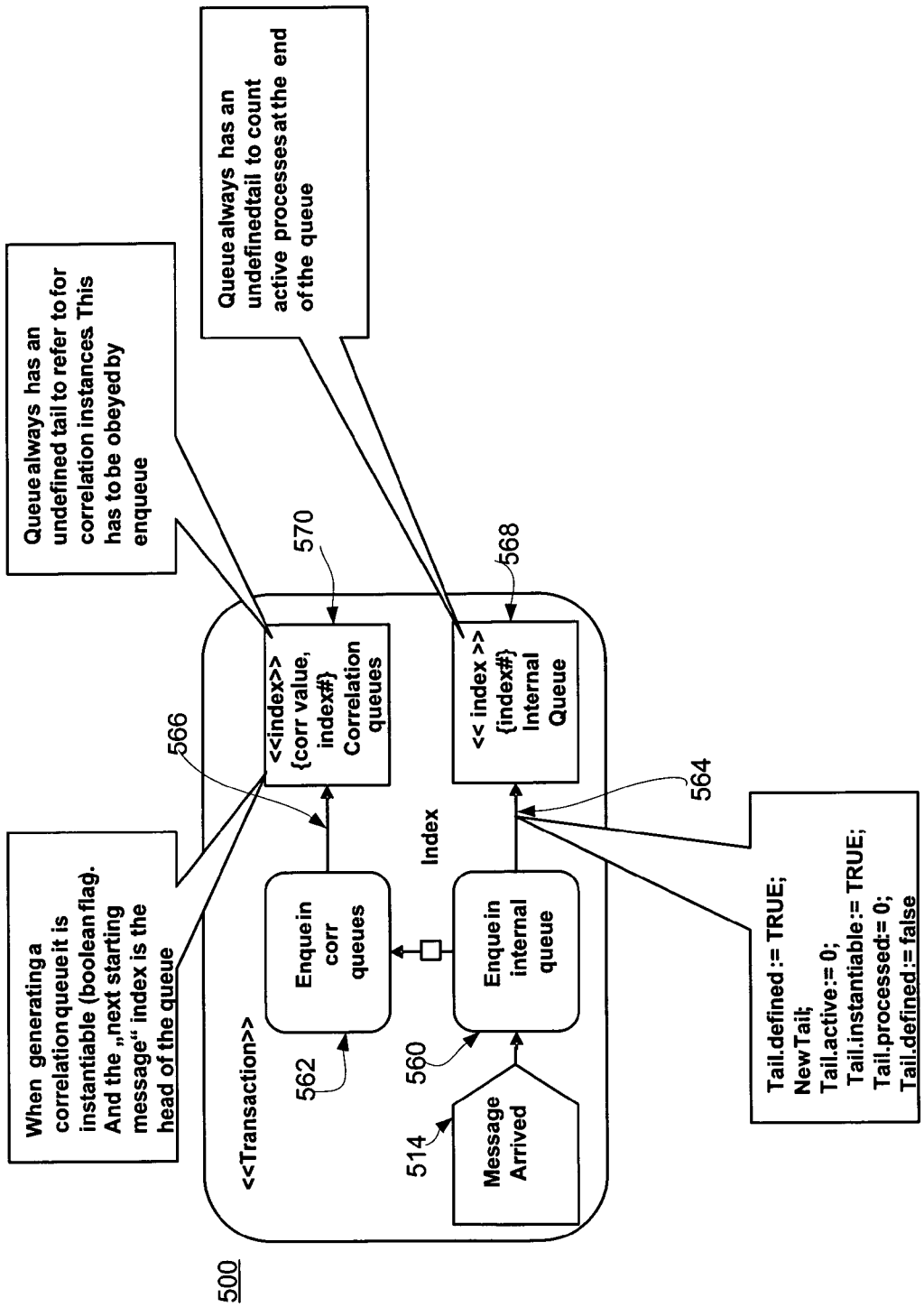
FIG. 5 is a diagram of activities that may be performed in response to a message arriving at a messaging system.

FIG. 5 is a diagram of activities 500 that may be performed in response to a message arriving at a messaging system. In response to a message arriving (514), the message is enqueued in a queue of messages (560), such as the internal queue 304 of FIG. 3, and the message in enqueued in one or more correlation queues (562). In addition, various properties associated with each message are initialized (564, 566). For example, for a queue of messages (568), such as the internal queue 304 of FIG. 3, the tail is set to being defined (e.g., the entry at the end of the queue is characterized as having a message); a new entry for the tail of the queue is generated; the new entry has an associated property initialized to characterize the entry as having no active process instances working on the entry (e.g., a variable for a number of active process instances is set to zero) and having no process instances having processed the entry (e.g., a variable for a number of processed entries is set to zero); a property associated with the entry that characterizes whether a process should work on the first message is initialized to indicate that a process has not yet worked on the message (e.g., the Instantiable variable 318 of FIG. 3 is set to true for a message of a type that should be worked on, such as a message that is to cause a process instance to be generated); and the tail (e.g., the tail that is not the new entry) is defined as being false (e.g., characterized as not having a message).

As another example, for a correlation queue (570), the tail is set to being defined (e.g., the entry at the end of the queue is characterized as having a message); a new entry for the tail of the queue is generated (e.g., a pointer to the message is queued); and the tail (e.g., the tail that is not the new entry) is defined as being false (e.g., characterized as not having a message). For circumstances where a correlation queue is generated, a property associated with the queue that characterizes whether a process is to work on the queue is initialized to indicate that a process has not yet worked on the message (e.g., one of the Instantiable variables 354 of FIG. 3 is set to true for a new correlation queue); a distinct value corresponding to the queue is associated with the queue (e.g., one of the Values 352 is initialized to a key value to correspond to messages in the correlation queue); and a variable to indicate a message to be processed in the queue is initialized (e.g., one of the next start message variables 356 of FIG. 3 is set to the head of the correlation queue).

Figure 6:
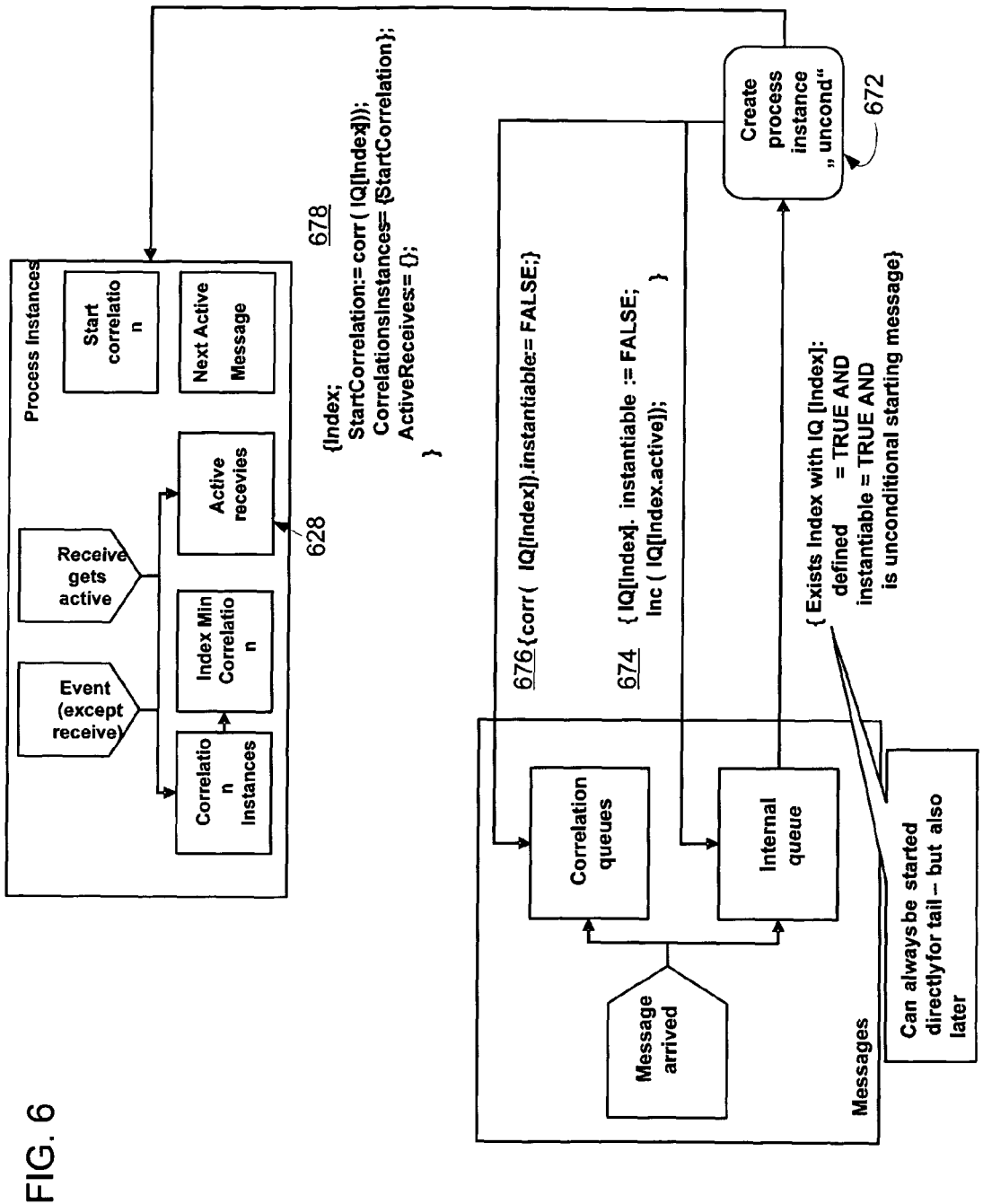
FIG. 6 is a diagram of activities that may be performed for a tail of a message queue.

FIG. 6 is a diagram of activities that may be performed for a tail of a message queue. The activities may be performed for messages for which a process instance is to be generated without conditions—a type of messages which may be referred to as unconditional start messages (e.g., without conditions or unconditional in a sense that a message does not depend on other process instances (e.g., a process instance existing for the key) or other messages (e.g., other messages being received)). Although the activities of FIG. 6 are indicated as being tail activities, the activities need not be limited to occurring for a tail of a queue (e.g., the activities may be performed on messages at any point in the internal queue 304 of FIG. 3).

For messages for which a process instance is to be generated, in a queue entry where the message is characterized as being defined and instantiable (e.g., a process instance has not already been generated for the queue entry), a process instance may be generated (672). Generating a process instance for such messages may include setting an instantiable variable to false and incrementing a number of active process instances for an associated internal queue entry (674). Also, properties for a corresponding correlation queue may be initialized (676) (e.g., a correlation queue may have a corresponding instantiable property set to indicate that a correlation queue need not be generated; e.g., after a correlation queue has been generated in response to arrival of the message), and a process instance may have properties initialized for the generated correlation queue and have properties for chaining initialized (678) (e.g., an index into the internal queue may be initialized to the message, a pointer to the correlation queue generated may be set, and criteria for an active receives (628) may be set to null).

Figure 7:
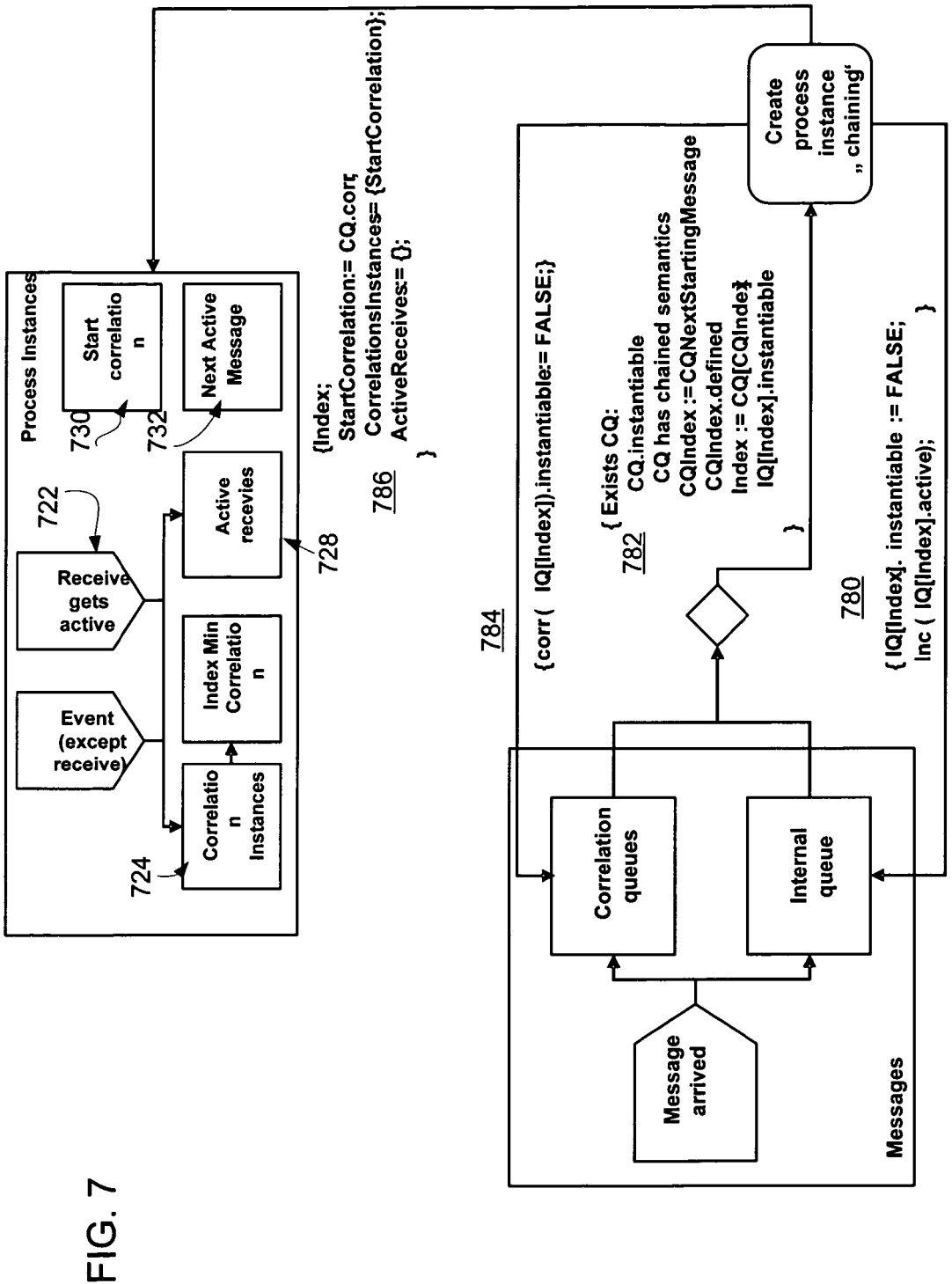
FIG. 7 is a diagram of activities that may be performed to correlate messages in a messaging system.

FIG. 7 is a diagram of activities that may be performed to start process instances for messages with "chaining" semantics in a messaging system. The activities may occur in response to determining that chaining is to be performed (e.g., a message indicates a chain of messages is to be received). To chain messages, various properties of a correlation queue may be checked (782), a process instance may be generated to process the messages (788), properties associated with the message and the correlation queue may be modified to reflect the generation of the process instance (780, 784), and properties of the generated process may be initialized (786). Checking properties of a correlation queue (782) for a chain of messages (e.g., to determine whether to chain messages) may include checking whether the correlation queue is instantiable (e.g., if a process is to be generated for the correlation queue; e.g., a correlation queue of a chain might not be instantiable if another process instance is processing the chain of messages), checking a property of the correlation queue to indicate the correlation queue has chaining semantics, setting an index of to the correlation queue to a next starting message of a correlation queue, checking whether the index of the correlation queue is defined, setting an index variable to the next starting message in the correlation queue, and checking whether the message in the internal queue is instantiable.

Modifying properties associated with the message to reflect the generation of the process instance (780) may include characterizing the message to not need a process instance to be generated (e.g., setting an associated instantiable property to false) and incrementing a number of active process instances handling the message. Modifying properties associated with the correlation queue to reflect the generation of the process instance (784) may include indicating that a process instance is not to be generated for the correlation queue (e.g., as a process instance has been generated).

Initializing properties of the generated process (786) may include setting an index value for an index into a queue of messages (e.g., setting the index into the internal queue 732), setting a pointer to the correlation queue (e.g., initializing the start correlation property 730), indicating the existence of the correlation queue as a related correlation queue (e.g., including the correlation queue in correlation instances 724), and clearing a filter for grouping of messages (e.g., setting the active receives filter 728 to null).

Figure 8:
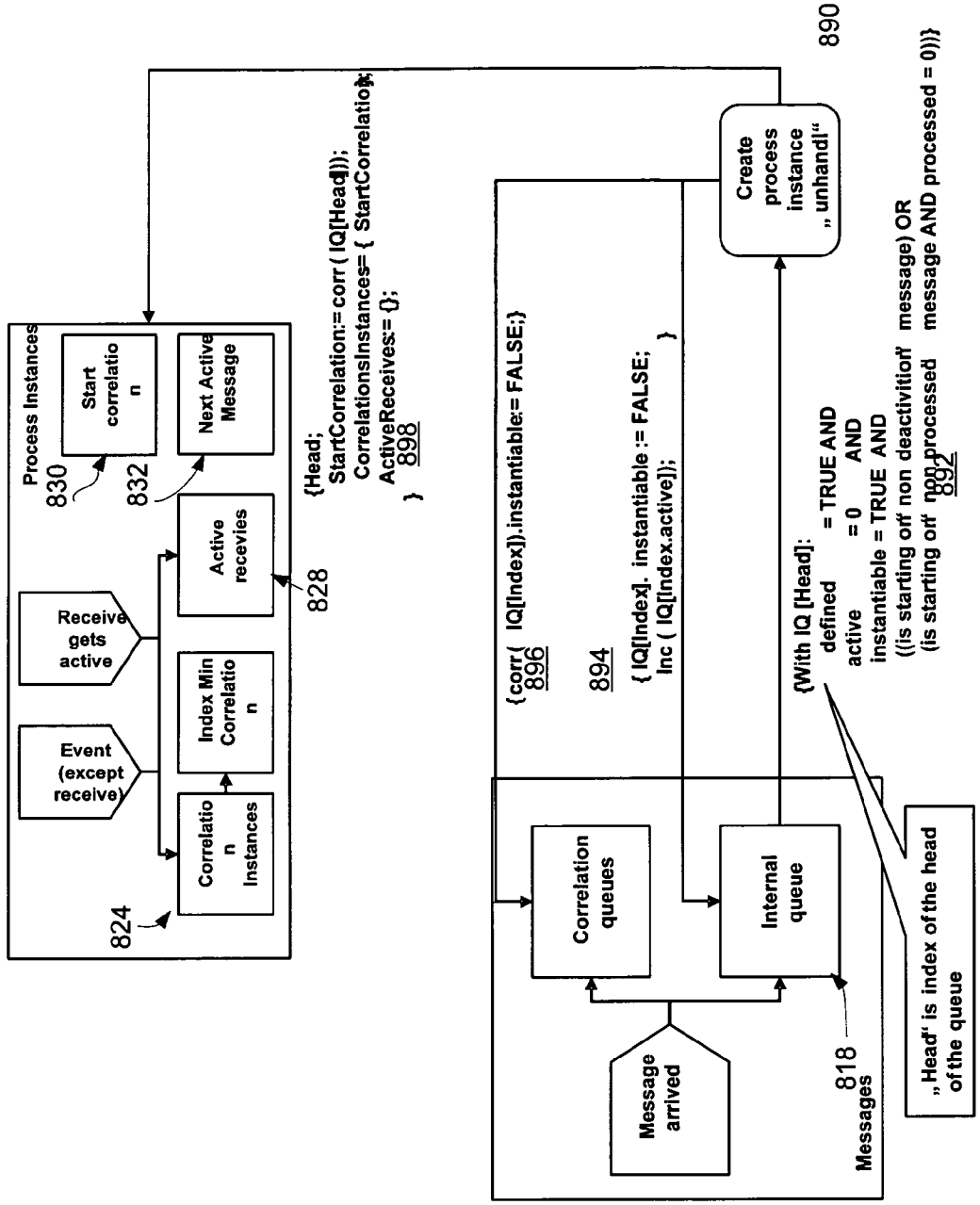
FIG. 8 is a diagram of activities that may be performed for a head of a message queue to generate a process instance.

FIG. 8 is a diagram of activities that may be performed for a head of a message queue to generate a process instance. A process instance may be generated (890) in response to determining that a head of a message queue has a message (e.g., the head of the queue is defined); has no active process instances handling the message; is a message for which a process instance is to be generated (e.g., were the Instantiable property 318 of the first message in the internal queue 304 of FIG. 3 set to true); and, the message is a type of message to be processed by a process instance if no process instance exists for the message and the message has not been processed (e.g., the message is not to deactivate a process instance or processing the message is not optional) (892). Advantageously, under these circumstances, a message may be worked on that might otherwise become a zombie message in other messaging systems.

In addition to generating a process instance (890), properties associated with the message and the correlation queue may be modified to reflect the generation of the process instance (894, 896), and properties of the process instance may be initialized (898). Modifying properties associated with the message to reflect the generation of the process instance (894) may include characterizing the message to not need a process instance to be generated (e.g., setting an associated instantiable property to false) and incrementing a number of active process instances handling the message. Modifying properties associated with the correlation queue to reflect the generation of the process instance (896) may include indicating that a process instance is not to be generated for the correlation queue (e.g., as a process instance has been generated).

Initializing properties of the generated process (898) may include setting an index value for an index into a queue of messages (e.g., setting the index into the internal queue 832 as the head of an internal queue 818), setting a pointer to the correlation queue (e.g., initializing the start correlation property 830), indicating existence of the correlation queue as a related correlation queue (e.g., including the correlation queue in correlation instances 824), and initializing a filter for grouping of messages (e.g., setting the active receives filter 828 to null).

Figure 9:
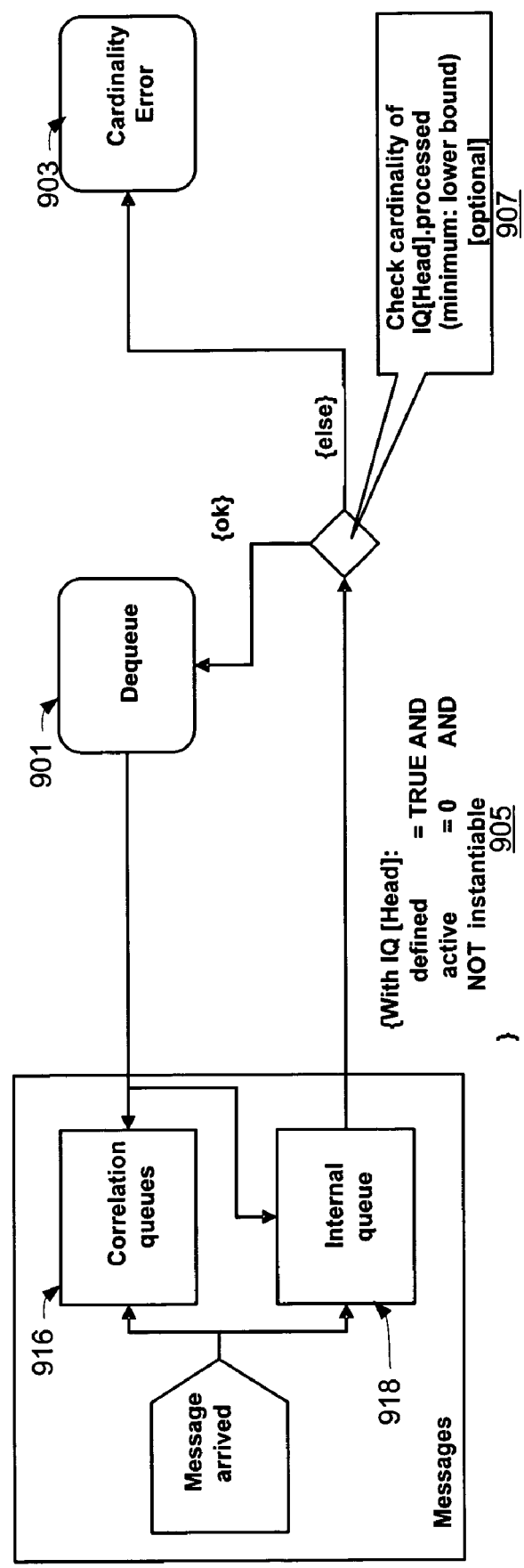
FIG. 9 is a diagram of activities that may be performed for a head of a message queue to dequeue a message.

FIG. 9 is a diagram of activities that may be performed for a head of a message queue to dequeue a message. Based on a determination (905) that a message at a head of a queue (e.g., a head of the internal queue 918) is defined, no process instances are working on the message, and the message is not a message that needs to be worked on (e.g., the message has been worked on such that the Instantiable property 318 is false for a message that is a starting message), a further determination (907) may be made to ensure that a minimum number of process instances have processed the message (e.g., by checking a property associated with the message that characterizes a number of process instances that have processed the message against a property of the message indicating a number of process instances to process the message). For example, if a message indicates it is to be processed by at least two process instances, the determination (907) may check to ensure that at least two process instances have processed the message. If the further determination (907) results in a determination that a minimum number of process instances have not processed the message, an error may result (e.g., the cardinality error 903). Otherwise, the message may be dequeued (901) from the queue of messages (e.g., the internal queue 918), and the message may further be removed from a correlation queue 916. In variations a cardinality check may be optional.

In variations, messages need not be at a head of a queue to be dequeued. For example, messages which need only be processed by one process instance and have been processed once may be dequeued before reaching a head of a queue of messages. A combination of dequeueing techniques may be implemented.

Figure 10:
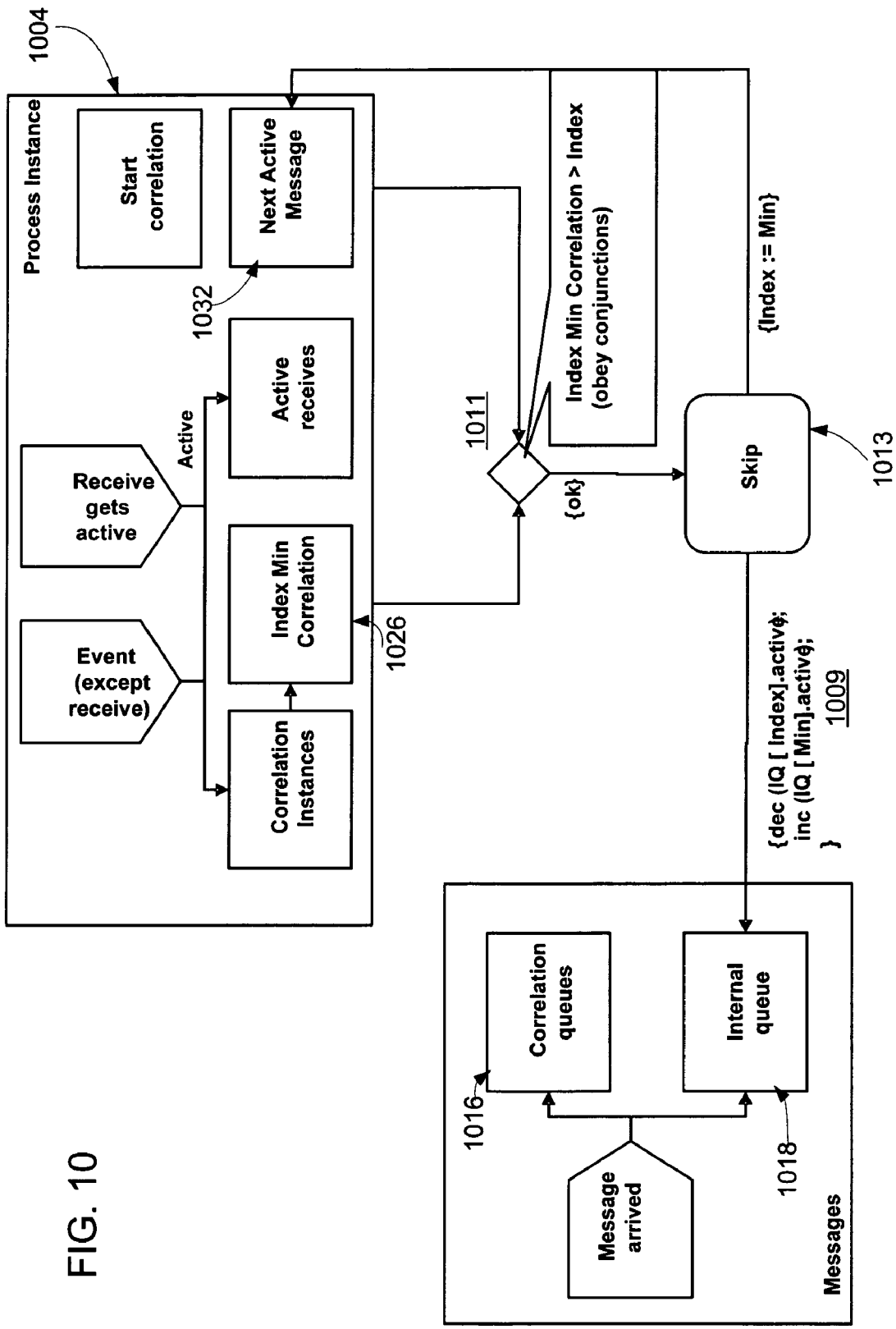
FIG. 10 is a diagram of activities that may be performed for a queue of messages to skip processing of a message by a process instance.

FIG. 10 is a diagram of activities that may be performed for a queue of messages to skip processing of a message by a process instance 1004. The process instance 1004 may skip processing (1013) of a message (or messages) in a queue of messages if the message is indicated as not being in a correlation queue corresponding to the process instance 1004. For example, the process instance 1004 may make a determination (e.g., 1011) that an index 1032 into to an internal queue 1018 (e.g., a queue of messages) is less than an index into the queue of messages from any correlation queues 1016 corresponding to the process instance 1004, and skip processing of the message (1013). Skipping processing of the message (or multiple messages) may include setting the index into the queue of messages to the minimum index from the correlation queues (e.g., setting an index 1032 of the process instance 1004 into the internal queue 1018 to a minimum index 1026 into any of the correlation queues 1016; e.g., an index to a next message to be processed by a process instance; e.g., out of several correlation queues associated with a process instance, the property may indicate which message is to be processed by the process instance, which may result in processing messages from an earliest point in the internal queue to a later point). In addition to skipping processing of the message, properties associated with the message may be modified to reflect skipping processing (1009). Modifying properties associated with a message to reflect skipping processing (1009) may include decrementing a number of process instances handling the message and incrementing the number of process instances handling the next message to be processed by the process instance 1004.

Figure 11:
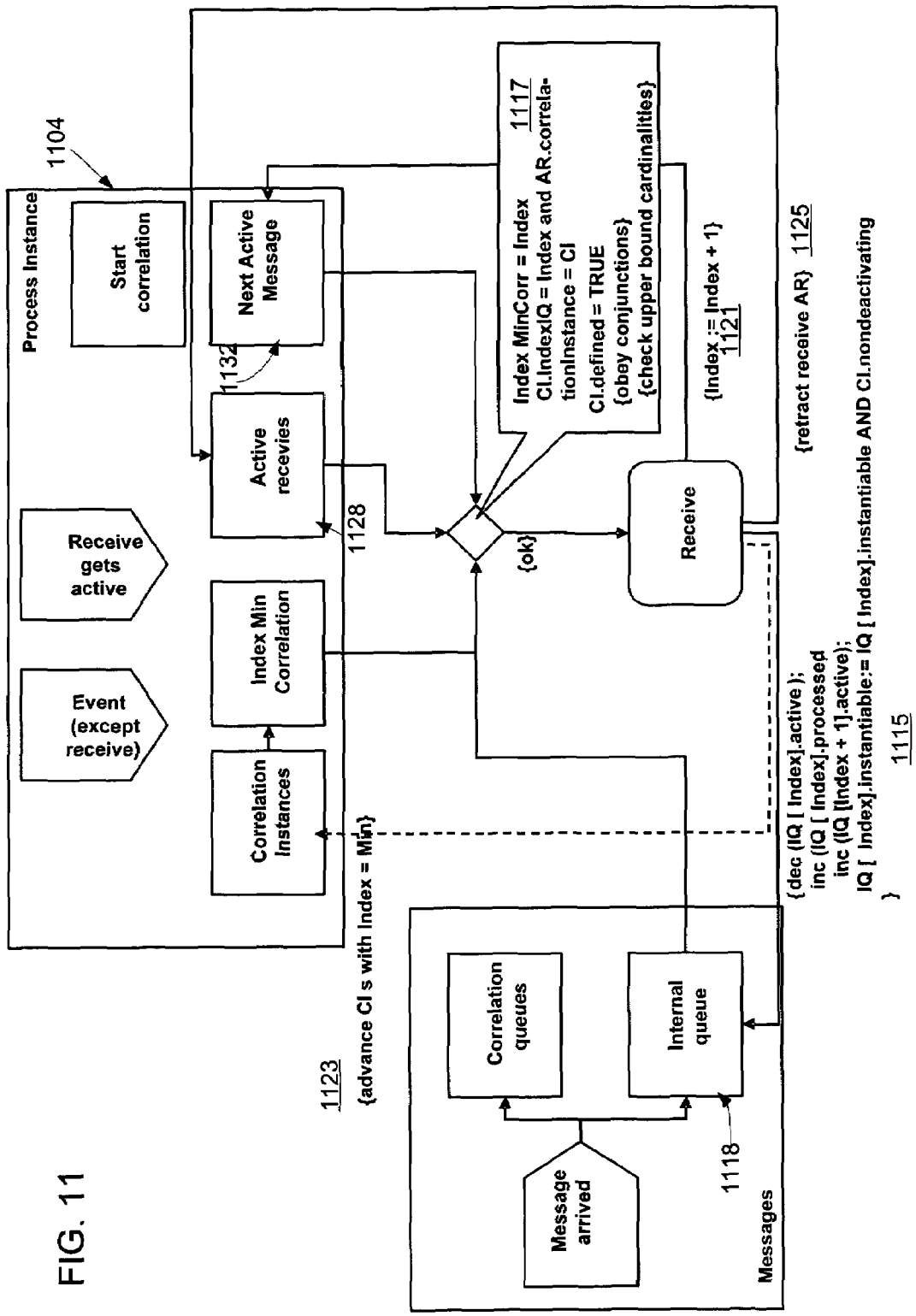
FIG. 11 is a diagram of activities that may be performed in response to a message being received.

FIG. 11 is a diagram of activities that may be performed in response to a message being received by a process instance (e.g., similar to the BPEL receive concept). A message may match criteria for being a message to cause processing of a group of messages based on criteria characterized by an active receives property 1128. A message may be received by a process instance (1117), if it matches one of the correlation instances, there is an active receive for that correlation instance, the IQindex of that active receive is equal to the index min correlation, and the correlation instance is defined. Upper bound cardinalities for the number of process instances to work on the message may be checked.

In response to a message that is to be processed being received by a process instance, other activities may be performed in a messaging system to reflect the processing, including incrementing 1121 the index 1132 into the internal queue of messages 1118, retracting 1125 an active receive, advancing 1123 along correlation instances associated with the processing instance 1104, and modifying 1115 properties associated with the message in the internal queue to reflect the processing (e.g., decrementing the number of active process instances associated the processed message, incrementing the number of process instances that have processed the message, incrementing the number of messages handling the next message in the internal queue 1118, and setting the status of whether process instances are to process the message based whether it was to be processed and whether the current correlation instance is considered a deactivating correlation instance (e.g., whether the current correlation instance is not to be deactivated and is to be processed)).

Figure 12:
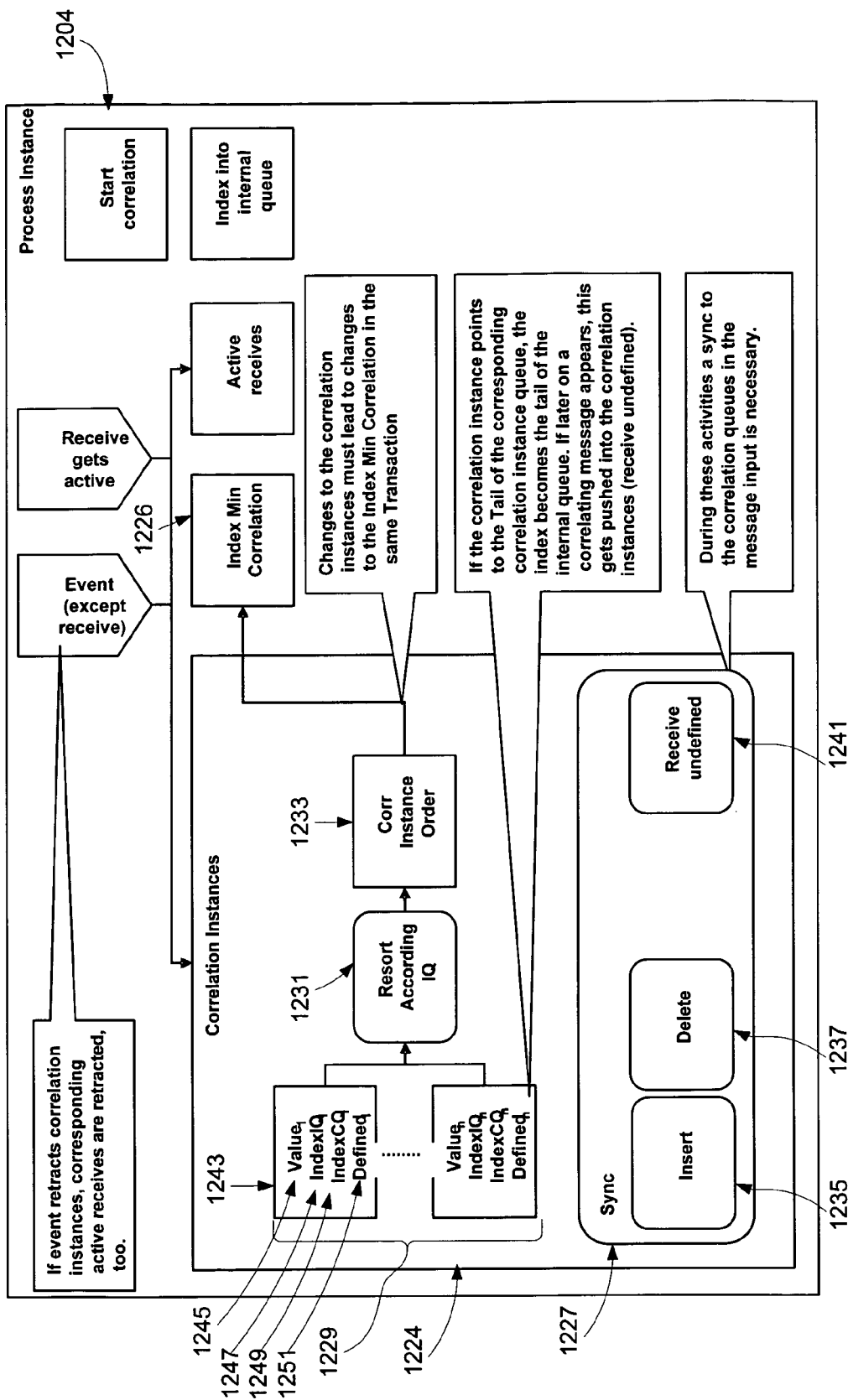
FIG. 12 is a diagram of a process instance.

FIG. 12 is a diagram of a process instance 1204. The process instance 1204 includes correlation instances 1224 that may characterize correlation queues corresponding to the process instance 1204. To characterize correlation queues, the process instance 1204 may include combinations of properties 1229 that relate to each correlation queue, with a combination of a value (e.g., a key) identifying a correlation queue, an index into a queue of messages to be worked for the correlation queue, an index into the correlation queue, and a property characterizing whether the correlation queue is defined (e.g., whether valid messages correspond to the correlation queue). For example, the process instance 1204 includes a first combination of properties 1243 that includes a value 1245 identifying a correlation queue, an index 1247 into an internal queue of messages to identify a message (e.g., to be processed or being processed), an index 1249 into the correlation queue to an entry identifying the message, and a defined property 1251 to indicate whether the correlation queue is defined (e.g., whether the correlation queue is associated with messages).

The combinations of properties 1229 for correlation queues in the correlation instances 1224 may be sorted 1231 to identify a combination of properties corresponding to a next message to be processed in a queue of messages (e.g., in the internal queue of messages 304 of FIG. 3). To sort 1231 the combinations of properties 1229, the index into the queue of messages may be used and a resulting order of correlation instances 1233 may be computed. As the order of correlation instances 1233 may easily identify an index 1226 to a lowest message in the queue of messages for the correlation instances 1224 (e.g., referred to as a minimum correlation index), the index 1226 may be set based on the order of correlation instances 1233.

Activities of the correlation instances 1224 may include synchronization 1227 of the combination of properties 1229 for correlation queues to correlation instances. Synchronization 1227 may include activities related to inserting 1235 a new correlation instance (e.g., to correspond to a correlation queue), deleting 1237 a correlation instance (e.g., to retract the relation to a correlation queue), and receiving 1241 a message not associated with the correlation instances 1224 (e.g., a message is not associated with an existing correlation queue).

Figure 13:
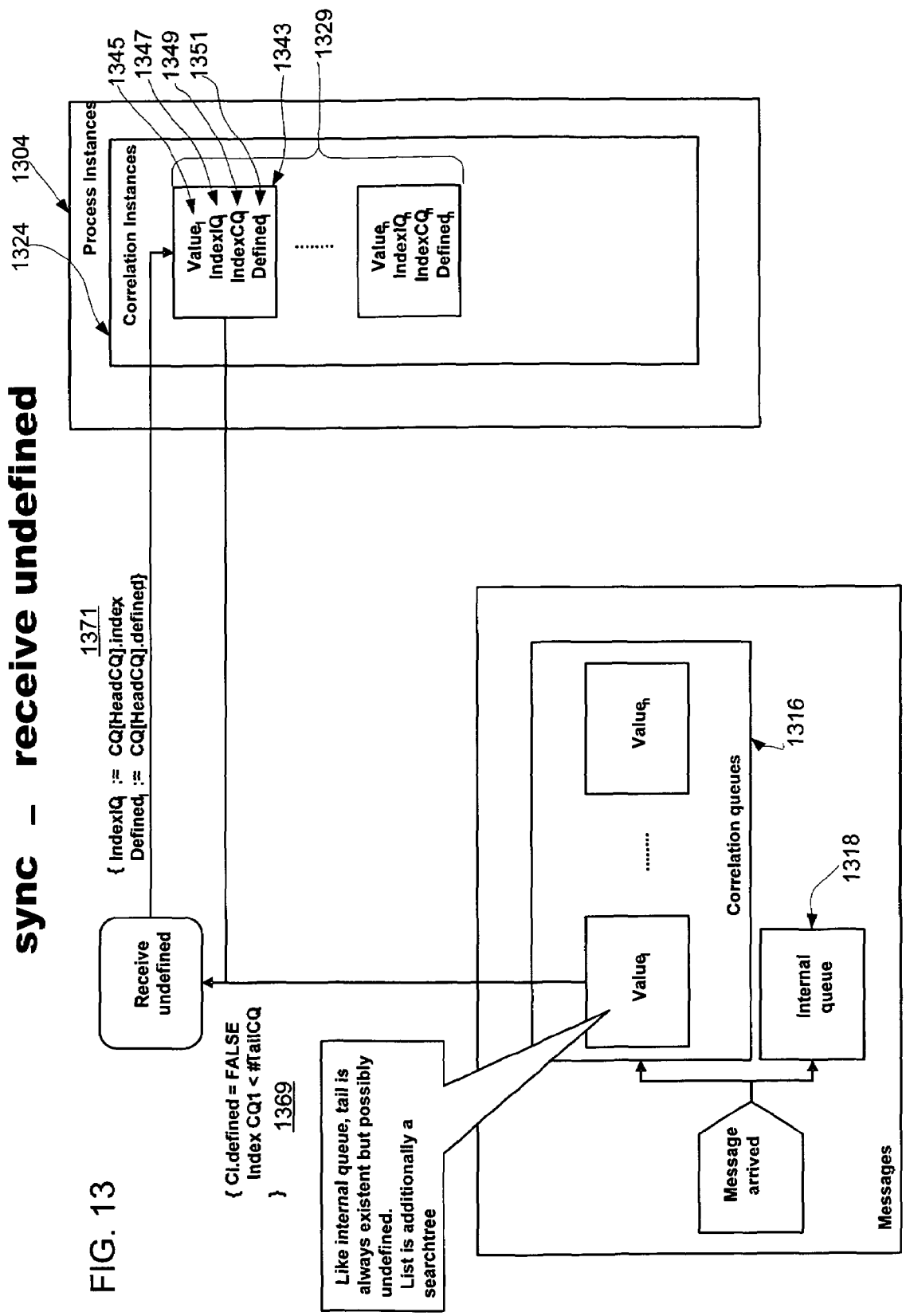
FIG. 13 is a diagram of activities that may be performed to synchronize correlation queues with correlation instances.

FIG. 13 is a diagram of activities that may be performed to synchronize correlation queues with correlation instances. Activities of FIG. 13 may occur in response to receiving a message (e.g., a message referred to by a head of a correlation queue) not associated with one of the correlation instances 1324 that are associated with the process instance 1304 or to process a next message in one of the correlation queues 1316.

A message inserted into a correlation queue may be determined to be associated with none of the correlation instances of a process instance if there is no matching and unhandled message in the correlation queue for the process instance. For example, a message may be determined to not be associated with one of the correlation instances 1324, in response to determining 1369 that the correlation instances 1324 includes a combination of properties 1329 that indicates the associated correlation instance is not defined (e.g., as indicated by a defined property 1351) and the tail of the correlation queue for the received message has a greater index value than an index 1349 into the correlation queue. The combination of properties 1343 that corresponds to the correlation instance may be modified 1371 to associate the message with the correlation instances 1324. Modifying 1371 the combination of properties 1343 may include setting an index 1347 into an internal queue of messages 1318 to the location of the received message in the internal queue of messages 1318.

Figure 14:
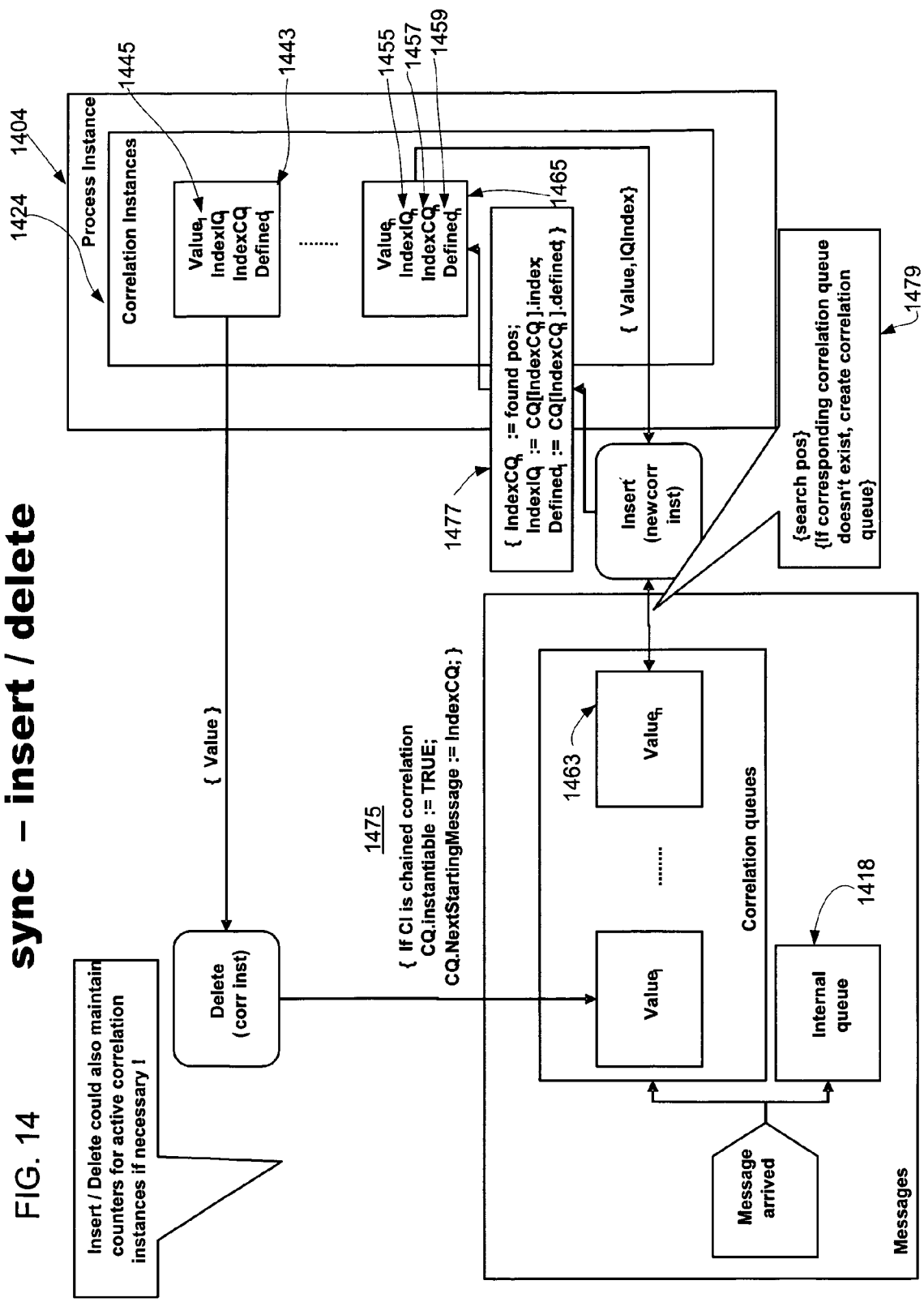
FIG. 14 is a diagram of activities that may be performed to synchronize a messaging system.

FIG. 14 is a diagram of activities that may be performed to synchronize a messaging system. The activities relate to synchronizing correlation queues and correlation instances to reflect a correlation instance being generated or a correlation instance being deleted. A correlation instance may be generated, for example, in response to a message being received, at a messaging system, where the message is associated with a value 1463 and determining 1479 that none of the correlation instances 1424 in the messaging system are associated with that value. A correlation instance being generated may include generating 1477 a combination of properties 1465 that correspond to the correlation queue (in the correlation instances 1424 of a process instance 1404). For example, generating 1477 a combination of properties 1465 may include setting an index 1457 to the correlation queue, and setting an index 1455 for the message corresponding to the correlation queue in an internal queue 1418. In addition, a property 1459 indicating whether an entry for the message is defined in the internal queue of messages 1418 may be set.

A correlation instance may be deleted, for example, in response to a process instance 1404 determining to stop processing of the correlation instance. Synchronizing a messaging system in response to a correlation instance being deleted may include modifying properties of a correlation queue to reflect a process instance is no longer associated with the correlation queue. For example, the process instance 1404 may send a value 1445 corresponding to a correlation instance to be deleted, remove a combination of properties 1443 corresponding to the value 1445. The messaging system may determine whether the correlation queue corresponding to the correlation instance is a chaining correlation and, if so, set a property of the corresponding correlation queue to reflect that the correlation queue is to be processed (e.g., to instantiable; e.g., such that another process instance may be generated to process messages in the correlation queue, as the process instance 1404 might not process messages in the correlation queue) and set a next starting message of a correlation queue to an index value of the correlation queue (1475).

Although there is a certain grouping of activities in FIGS. 4-14 and a description of actors that perform the activities, the grouping may differ and different actors may perform the various activities. Also, the activities of FIGS. 4-14 may occur in a messaging system that does not include correlation queues, such as the messaging system 200 of FIG. 2, in variations. For example, in the high-level diagram of FIG. 4, messages might not be queued in correlation queues.

Figure 15:
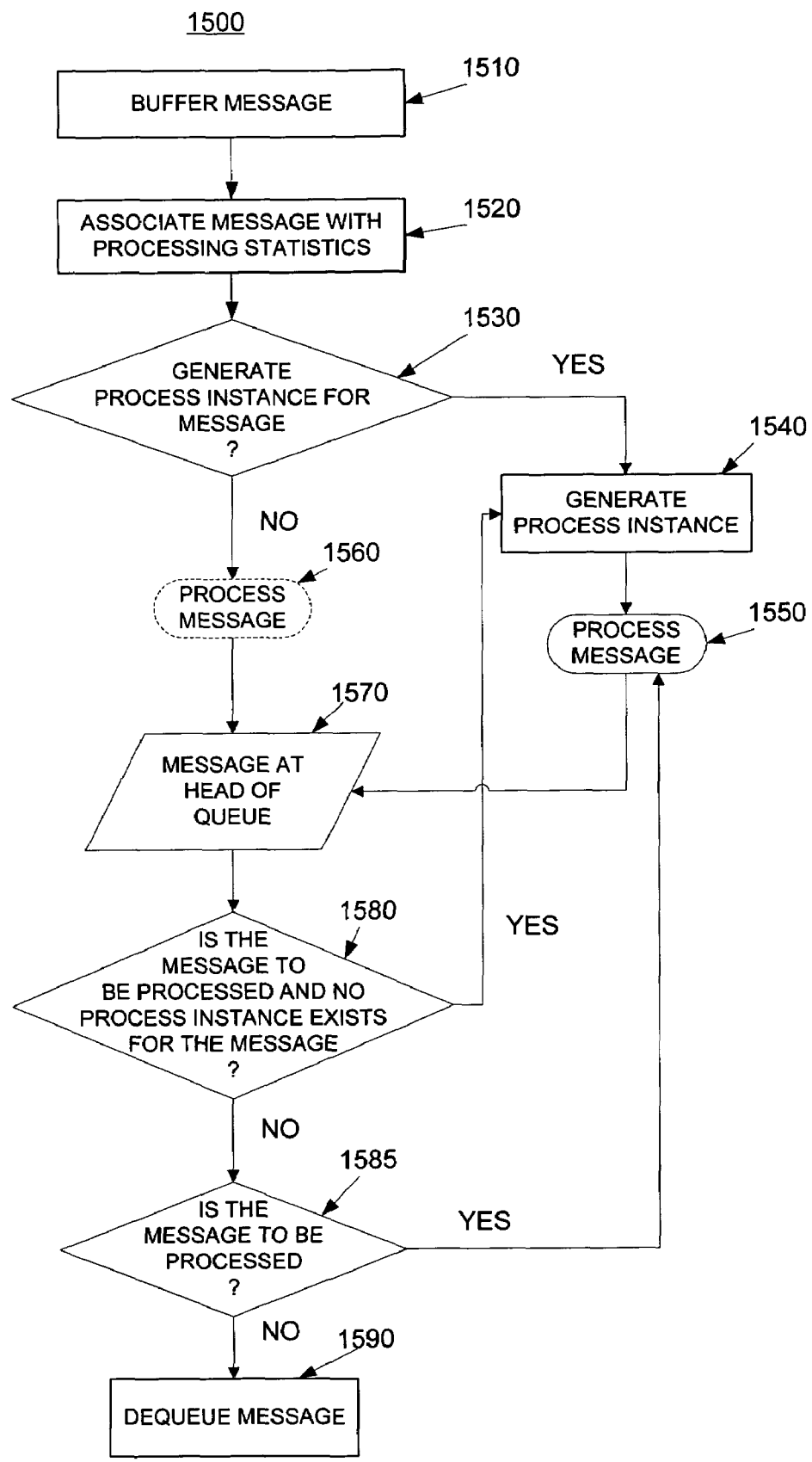
FIG. 15 is a flowchart illustrating activities of a messaging system.

FIG. 15 is a flowchart illustrating activities of a messaging system. The messaging system may be the messaging system 200 of FIG. 2 or the messaging system 300 of FIG. 3. A message is buffered (1510). The message may be buffered in a queue of messages of a messaging system. The queue may be a queue of messages that is referenced by several process instances that operate independently (e.g., and, in parallel). The queue may be the only queue of messages for the messaging system.

A message (e.g., the message of 1510) is associated (1520) with processing statistics. The association may be performed by a module that buffers messages in the queue of messages. The processing statistics may include a characterization of whether a process instance is to be generated for the message, a number of process instances that are handling the message, and a number of process instances that have processed the message. These statistics may be used as a tacit form of communication between processing instances that work on the message and other components of the messaging system (e.g., a module that buffers the messages).

A determination (1530) is made as to whether a process instance is to be generated to process a message (e.g., the message of 1520). The process instance may be generated depending on a type of the message. For example, a message may be considered an unconditional starting message for which process instances are always to be generated. If a process instance is to be generated, a process instance is generated (1540) and the message is processed (1550). If a determination is made that a process instance is not to be generated, the message may optionally be processed (1560) by another process instance.

The message (e.g., the message of 1550 or 1560) may reach a head of a queue (1570). In response to being at a head of the queue, a determination (1580) is made as to whether the message is to be processed and a process instance exists for the message. The process may need to be processed, for example, if a process instance was not generated for the message or a process instance for the message never existed to process the message. A process might not need to be processed if the message was processed (e.g., if the message only needed to be processed at least once), the message was processed a threshold number of times (e.g., if the message was to be processed at least three times and the message was processed three times), or the message is to be optionally processed (e.g., if a message is a type of message that does not need to be processed).

If the message is to be processed and no process instance exists for the message, a process instance is generated (1540); otherwise, if the message is to be processed and a process instance exists (1585), the message may be processed (1550) by a process instance. If the message is not to be processed, the message may be dequeued (1590).

In variations, the operations of the flowchart 1500 may be modified for another messaging system (e.g., fewer, different, or additional operations may be performed). As examples, messages may be queued in correlation queues, activities of synchronization may occur, chaining semantics may be followed, and packaging of messages may occur.

Various implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, the operations can differ and still achieve desirable results. In certain implementations, multitasking and parallel processing may be preferable. Other embodiments are within the scope of the following claims.

What is claimed is:

1. A computer-implemented method implemented by one or more processors, the method comprising:
    buffering, using at least one of the one or more processors, a message in a queue of incoming messages,
    associating, using at least one of the one or more processors, the message with processing statistics, the processing statistics characterizing:
        whether a process instance is to process content of the message;
        a number of process instances handling the message; and
        a number of process instances that have processed the content of the message;
    generating, using at least one of the one or more processors, a process instance to process the content of the message if the message is indicated as being a type message for which a process instance is to be generated; and
    dequeueing, using at least one of the one or more processors, the message based on the processing statistics, the message being dequeued:
        if the processing statistics indicate that no process instances are handling the message and that no process instance is to process content of the message, or,
        if the content of the message is to be processed by a threshold number of process instances, and the processing statistics indicate that the threshold number of process instances have processed the content of the message,
        wherein messages which are to be processed exactly once and have been processed once are dequeued regardless of a position in the queue.

2. A method in accordance with claim 1, wherein the processing statistics are initialized to characterize that a process instance is to process the content of the message, no process instances have handled the message, and no process instances have processed the message.

3. A method in accordance with claim 1, wherein the generating the process instance is part of a message protocol for a business process that initiates processing the message to perform a business activity.

4. A method in accordance with claim 1, wherein the dequeueing is performed for messages at a head of the queue.

5. A computer-implemented method implemented by one or more processors, the method comprising:
    buffering, using at least one of the one or more processors, a message in a queue of incoming messages,
    associating, using at least one of the one or more processors, the message with processing statistics, the processing statistics characterizing:
        whether a process instance is to process content of the message;
        a number of process instances handling the message; and
        a number of process instances that have processed the content of the message;
    generating, using at least one of the one or more processors, a process instance to process the content of the message if the message is indicated as being a type message for which a process instance is to be generated; and
    dequeueing, using at least one of the one or more processors, the message based on the processing statistics, the message being dequeued:
        if the processing statistics indicate that no process instances are handling the message and that no process instance is to process content of the message, or,
        if the content of the message is to be processed by a threshold number of process instances, and the processing statistics indicate that the threshold number of process instances have processed the content of the message,
    wherein the generating a process instance is dependent on the message being a type of message for which process instances are to be generated regardless of a status of process instances, or the message being a type of message for which process instances are to be generated if a corresponding process instance does not exist and the message is at a head of the queue.

6. A computer-implemented method implemented by one or more processors, the method comprising:
    buffering, using at least one of the one or more processors, a message in a queue of incoming messages,
    associating, using at least one of the one or more processors, the message with processing statistics, the processing statistics characterizing:
        whether a process instance is to process content of the message;
        a number of process instances handling the message; and
        a number of process instances that have processed the content of the message;
    generating, using at least one of the one or more processors, a process instance to process the content of the message if the message is indicated as being a type message for which a process instance is to be generated;
    dequeueing, using at least one of the one or more processors, the message based on the processing statistics, the message being dequeued:
        if the processing statistics indicate that no process instances are handling the message and that no process instance is to process content of the message, or,
        if the content of the message is to be processed by a threshold number of process instances, and the processing statistics indicate that the threshold number of process instances have processed the content of the message;
    buffering, using at least one of the one or more processors, a pointer to the message in a correlation queue based on a key identifying an activity associated with the message, the key computed based on the message and the correlation queue corresponding to the activity; and
    if a process instance is generated to process the message, associating, using at least one of the one or more processors, a combination of properties characterizing the message with the processing instance, the combination of properties comprising an identification of a position of the message in the correlation queue.

7. A computer program product operable to cause one or more processors to perform operations comprising:
- buffering, by at least one of the one or more processors, first data representing an event in a queue of second data representing a plurality of events,
- associating, by at least one of the one or more processors, the first data with processing statistics, the processing statistics characterizing:
  - whether a process instance is to process the first data;
  - a number of process instances handling the first data; and
  - a number of process instances that have processed the first data;
- generating, by at least one of the one or more processors, a process instance to process the first data if the first data is indicated as data for which a process instance is to be generated; and
- dequeueing, by at least one of the one or more processors, the first data based on the processing statistics, the first data being dequeued:
  - if the processing statistics indicate that no process instances are handling the first data and that no process instance is to process the first data, or,
  - if the first data is to be processed by a threshold number of process instances, and the processing statistics indicate that the threshold number of process instances have processed the first data,
- wherein first data which is to be processed exactly once and has been processed once is dequeued regardless of a position in the queue.

8. A computer program product in accordance with claim 7, wherein the first data is a message.

9. A computer program product in accordance with claim 7, wherein the processing statistics are initialized to characterize that a process instance is to process the first data, no process instances have handled the first data, and no process instances have processed the first data.

10. A computer program product in accordance with claim 7, wherein the generating the process instance is part of a protocol for a business process that initiates processing the first data to perform a business activity.

11. A computer program product in accordance with claim 7 to further cause the data processing apparatus to perform operations comprising:
- associating the first data with a process instance as being data representing a first event for a group of one or more events to be processed if certain criteria is met;
- determining whether the criteria is met; and
- processing the first data in response to a determination that the criteria is met.

12. A computer program product operable to cause one or more processors to perform operations comprising:
- buffering, by at least one of the one or more processors, first data representing an event in a queue of second data representing a plurality of events,
- associating, by at least one of the one or more processors, the first data with processing statistics, the processing statistics characterizing:
  - whether a process instance is to process the first data;
  - a number of process instances handling the first data; and
  - a number of process instances that have processed the first data;
- generating, by at least one of the one or more processors, a process instance to process the first data if the first data is indicated as data for which a process instance is to be generated; and
- dequeueing, by at least one of the one or more processors, the first data based on the processing statistics, the first data being dequeued:
  - if the processing statistics indicate that no process instances are handling the first data and that no process instance is to process the first data, or,
  - if the first data is to be processed by a threshold number of process instances, and the processing statistics indicate that the threshold number of process instances have processed the first data,
- wherein the generating a process instance is dependent on the first data being data for which process instances are to be generated regardless of a status of process instances, or the first data being data for which process instances are to be generated if a corresponding process instance does not exist and the first data is at a head of the queue.

13. A computer program product operable to cause one or more processors to perform operations comprising:
- buffering, by at least one of the one or more processors, first data representing an event in a queue of second data representing a plurality of events,
- associating, by at least one of the one or more processors, the first data with processing statistics, the processing statistics characterizing:
  - whether a process instance is to process the first data;
  - a number of process instances handling the first data; and
  - a number of process instances that have processed the first data;
- generating, by at least one of the one or more processors, a process instance to process the first data if the first data is indicated as data for which a process instance is to be generated; and
- dequeueing, by at least one of the one or more processors, the first data based on the processing statistics, the first data being dequeued:
  - if the processing statistics indicate that no process instances are handling the first data and that no process instance is to process the first data, or,
  - if the first data is to be processed by a threshold number of process instances, and the processing statistics indicate that the threshold number of process instances have processed the first data;
- buffering, by at least one of the one or more processors, a pointer to the first data in a correlation queue based on a key identifying an activity associated with the first data, the key computed based on the first data and the correlation queue corresponding to the activity; and
- if a process instance is generated to process the first data, associating, by at least one of the one or more processors, a combination of properties characterizing the first data with the processing instance, the combination of properties comprising an identification of a position of the first data in the correlation queue.

* * * * *